US012507056B2

(12) United States Patent
Jung et al.

(10) Patent No.: US 12,507,056 B2
(45) Date of Patent: Dec. 23, 2025

(54) ELECTRONIC DEVICE FOR PERFORMING CLUSTER MERGING IN NAN COMMUNICATION AND OPERATION METHOD OF ELECTRONIC DEVICE

(71) Applicant: Samsung Electronics Co., Ltd., Suwon-si (KR)

(72) Inventors: Buseop Jung, Suwon-si (KR); Junsung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 235 days.

(21) Appl. No.: 18/355,086

(22) Filed: Jul. 19, 2023

(65) Prior Publication Data

US 2024/0007838 A1 Jan. 4, 2024

Related U.S. Application Data

(63) Continuation of application No. PCT/KR2023/009268, filed on Jun. 30, 2023.

(30) Foreign Application Priority Data

Jul. 1, 2022 (KR) .................. 10-2022-0081376
Aug. 17, 2022 (KR) .................. 10-2022-0102636

(51) Int. Cl.
*H04W 40/32* (2009.01)
*H04W 8/00* (2009.01)
*H04W 84/18* (2009.01)

(52) U.S. Cl.
CPC ............ *H04W 8/005* (2013.01); *H04W 84/18* (2013.01)

(58) Field of Classification Search
CPC ..... H04W 40/32; H04W 8/005; H04W 84/18; H04W 48/16; H04W 84/12
See application file for complete search history.

(56) References Cited

U.S. PATENT DOCUMENTS 9,883,472 B1 * 1/2018 Tamhane ................ H04W 4/08
10,111,028 B2 10/2018 Fujimori
(Continued)

FOREIGN PATENT DOCUMENTS

JP 2018-117221 7/2018
KR 10-2016-0086370 7/2016
(Continued)

OTHER PUBLICATIONS

Search Report dated Oct. 5, 2023 in International Patent Application No. PCT/KR2023/009268.
(Continued)

*Primary Examiner* — Cindy Trandai
(74) *Attorney, Agent, or Firm* — Nixon & Vanderhye, P.C.

(57) ABSTRACT

An example electronic device may include a communication circuit, and a processor operatively connected to the communication circuit, wherein the processor is configured to generate first configuration information related to scanning to search for another cluster for cluster merging by the electronic device and a first external electronic device included in a neighbor awareness networking (NAN) cluster, control the communication circuit to transmit the first configuration information to the first external electronic device, control the communication circuit to perform scanning, based on the first configuration information, to search for a signal broadcast by an external electronic device belonging to another cluster, transmit, based on discovery of the another cluster, information on the another cluster to the first external electronic device, and perform a series of operations for merging into the another cluster, wherein the first configuration information is configured so that a time point at which the electronic device performs scanning and a time (Continued)

point at which the first external electronic device performs scanning are different.

20 Claims, 15 Drawing Sheets

(56) References Cited

U.S. PATENT DOCUMENTS

| | | | |
|---|---|---|---|
| 10,117,153 B2* | 10/2018 | Uno | H04W 36/0088 |
| 10,123,200 B2 | 11/2018 | Shmukler et al. | |
| 10,149,140 B2 | 12/2018 | Gupta et al. | |
| 10,314,060 B2* | 6/2019 | Sawada | H04W 8/005 |
| 2009/0290572 A1* | 11/2009 | Gonia | H04J 3/0641 |
| | | | 370/350 |
| 2015/0098388 A1* | 4/2015 | Fang | H04B 17/318 |
| | | | 370/328 |
| 2015/0131529 A1* | 5/2015 | Zhou | H04W 40/32 |
| | | | 370/328 |
| 2016/0286476 A1* | 9/2016 | Patil | H04W 40/32 |
| 2016/0345242 A1 | 11/2016 | Kim et al. | |
| 2017/0150296 A1* | 5/2017 | Jung | H04W 56/001 |
| 2018/0139276 A1 | 5/2018 | Raghupathy et al. | |
| 2018/0206283 A1* | 7/2018 | Fujimori | H04W 4/08 |
| 2018/0332547 A1 | 11/2018 | Liu et al. | |
| 2019/0132785 A1* | 5/2019 | Fujimori | H04W 48/20 |
| 2019/0132791 A1* | 5/2019 | Fujimori | H04W 48/18 |
| 2019/0141620 A1 | 5/2019 | Pujari et al. | |
| 2019/0174400 A1 | 6/2019 | Park et al. | |
| 2020/0081091 A1* | 3/2020 | Amin | G01S 5/02213 |
| 2020/0322872 A1* | 10/2020 | Jung | H04W 56/00 |
| 2022/0264282 A1 | 8/2022 | Jung | |
| 2022/0361095 A1 | 11/2022 | Jung et al. | |

FOREIGN PATENT DOCUMENTS

| | | |
|---|---|---|
| KR | 10-2021-0053532 | 5/2021 |
| WO | 2017057988 A1 | 4/2017 |
| WO | 2021/153896 | 8/2021 |

OTHER PUBLICATIONS

Written Opinion dated Oct. 5, 2023 in International Patent Application No. PCT/KR2023/009268.
Extended Search Report dated Jul. 4, 2025 in European Patent Application No. 23831964.4.
Camps-Mur, Daniel et al: "Enabling always on service discovery: WIFi neighbor awareness networking", IEEE Wireless Communications, vol. 22, No. 2, Apr. 1, 2015, 8 pages.
Anonymous: "Wi-Fi Aware (TM) Specification", Device Report Version 3.2, Oct. 23, 2020, 214 pages.

* cited by examiner

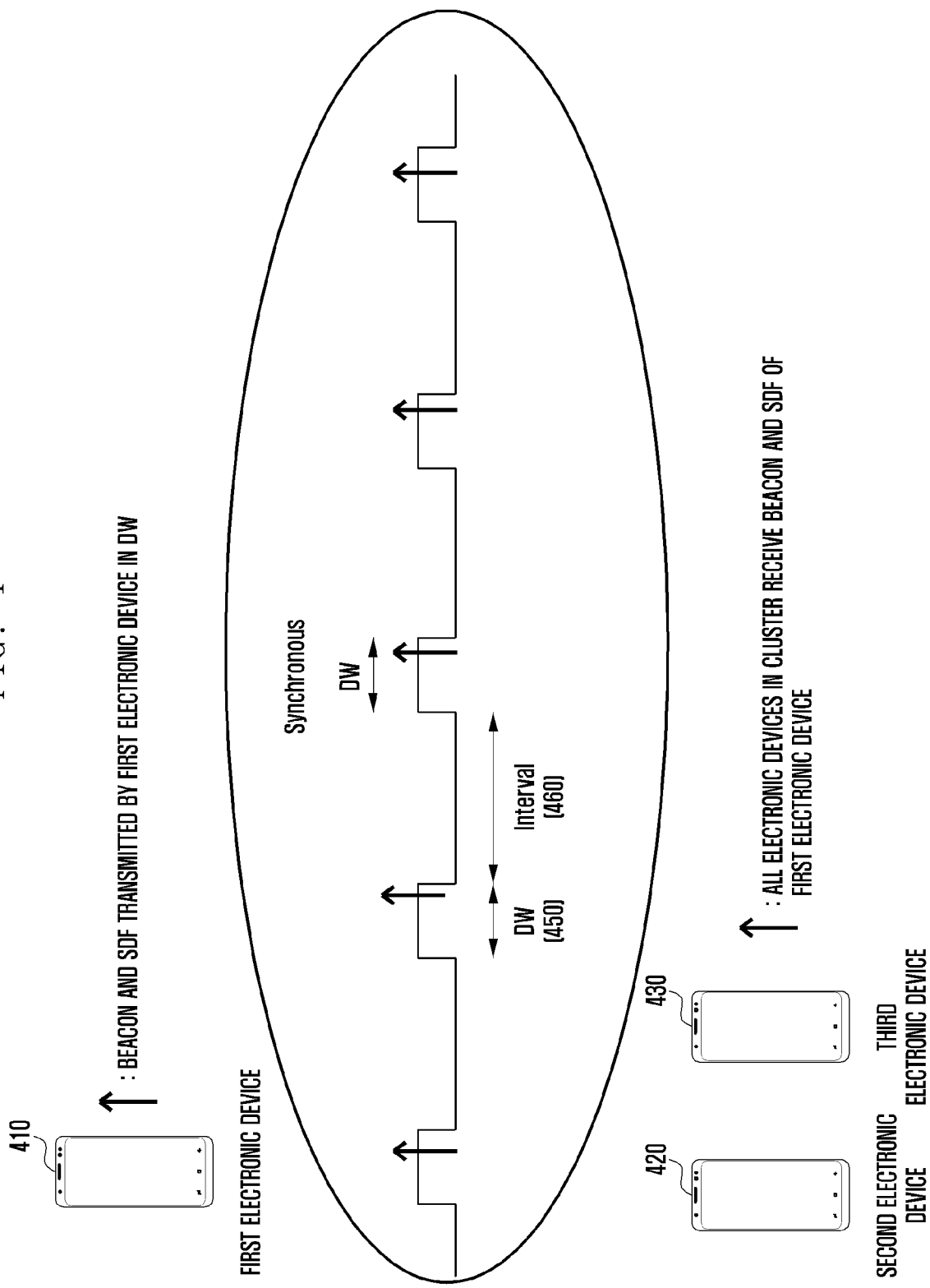

ELECTRONIC DEVICE FOR PERFORMING CLUSTER MERGING IN NAN COMMUNICATION AND OPERATION METHOD OF ELECTRONIC DEVICE

CROSS-REFERENCE TO RELATED APPLICATIONS

This application is a continuation of PCT/KR2023/009268, designating the United States, filed Jun. 30, 2023, in the Korean Intellectual Property Receiving Office, which claims priority to Korean Patent Application No. 10-2022-0081376 filed Jul. 1, 2022, in the Korean Intellectual Property Office and to Korean Patent Application No. 10-2022-0102636, filed Aug. 17, 2022, in the Korean Intellectual Property Office. The contents of each of these applications are incorporated by reference herein in their entireties.

BACKGROUND

Field

The disclosure relates to an electronic device and an operation method of the electronic device and, more particularly, to an electronic device for performing cluster merging of neighbor awareness networking (NAN) communication.

Description of Related Art

With the spread of various electronic devices, the speed of wireless communication available for various electronic devices has been improved.

In addition, various types of proximity services using a low-power discovery technology have recently been developed. For example, proximity services (or proximity communication services) which enable nearby adjacent electronic devices to quickly exchange data via a proximity network have been developed. The proximity services may include a low-power proximity service using a Bluetooth low energy (BLE) beacon, or a low-power proximity service based on a low-power short-range communication technology (e.g., neighbor awareness networking (NAN), Wi-Fi aware) (hereinafter, referred to as "NAN") based on a wireless local area network (WLAN).

A NAN-based low-power proximity service (hereinafter, referred to as "proximity service") refers to a service for which a proximity network that dynamically changes according to movement of an electronic device is configured and used, and a set of electronic devices constituting the proximity network may be referred to as a cluster. In the proximity services, electronic devices included in a cluster may transmit or receive a device discovery frame (SDF) (hereinafter, referred to as "SDF") and a signal (e.g., beacon) for discovery within a time duration (or communication duration) in which the electronic devices are synchronized with each other. For example, at least one electronic device in the cluster may transmit a signal for notifying of the presence of the cluster, and a new electronic device that is to join the cluster may receive the signal.

In order to reduce current consumption (or power consumption), the respective electronic devices in the cluster may have different active durations in which the electronic devices are able to transmit or receive signals. In NAN communication, an active duration in which a signal may be transmitted or received may be referred to as a discovery window (DW). Also, the electronic devices included in the cluster may reduce current consumption by maintaining a low-power state (e.g., a sleep state) outside of the discovery duration. Research on methods to reduce current consumption in NAN communication is being conducted.

SUMMARY

An electronic device may transmit or receive data within a discovery window. A discovery window may, for example, be a duration in which electronic devices included in a NAN cluster are activated, and the electronic devices may transmit and/or receive data in the discovery window. An electronic device included in the NAN cluster may perform scanning to search for another cluster in an interval other than the discovery window at a regular time cycle.

However, if the electronic device fails to search for another cluster while performing scanning, it may take a considerable amount of time until another cluster is found. In a situation in which the electronic device needs to perform a service by using another cluster, a service quality may be lowered, and furthermore, a situation in which the service cannot be performed may occur.

In addition, when the electronic device increases a duration of a scanning cycle, power consumption due to the increase in the duration of the scanning cycle may increase.

Technical tasks and advantages to be achieved in the disclosure are not limited to the technical tasks and advantages mentioned above, and other technical tasks and advantages that are not mentioned may be clearly understood based on the following descriptions.

An electronic device according to various example embodiments may include a communication circuit, and a processor operatively connected to the communication circuit, memory storing instructions, which when executed by the processor, cause the electronic device to generate first configuration information related to scanning to search for a neighbor awareness networking (NAN) cluster to which the electronic device does not belong, control the communication circuit to transmit the first configuration information to a first external electronic device which belongs to a NAN cluster to which the electronic device belongs, control the communication circuit to perform scanning, based on the first configuration information, to search for NAN cluster to which the electronic device does not belong, wherein the first configuration information includes second information to enable the first external electronic device to perform scanning to search for a NAN cluster at a first time point which is different from a second time point at which the electronic device performs scanning to search for a NAN cluster, and wherein the first information enables the first external electronic device to perform operations for merging the discovered NAN cluster and the NAN cluster to which the electronic device belongs.

An operation method of an electronic device according to various example embodiments may include generating first configuration information related to scanning to search for a neighbor awareness networking (NAN) cluster to which the electronic device does not belong; transmitting the first configuration information to a first external electronic device which belongs to a NAN cluster to which the electronic device belongs; based on the first configuration information, performing scanning to search for NAN cluster to which the electronic device does not belong; and wherein the first configuration information includes second information to enable the first external electronic device to perform scanning to search for a NAN cluster at a first time point which is different from a second time point at which the electronic device performs scanning to search for a NAN cluster, and wherein the first information enables the first external electronic device to perform operations for merging the discovered NAN cluster and the NAN cluster to which the electronic device belongs.

In an electronic device and an operation method of the electronic device according to various example embodiments of the disclosure, scanning may be performed with other electronic devices in a cluster. For example, the electronic device may configure a scanning interval of the electronic device to be different from a scanning interval of another electronic device. Therefore, if the electronic device fails to search for another cluster within a scanning interval, information of another cluster searched by another electronic device within a scanning interval may be received. The electronic device may perform cluster merging based on information of another cluster, thereby reducing the time required for cluster merging. Furthermore, the electronic device may maintain (or improve) a service quality by fast cluster merging.

The effects obtainable in the present disclosure are not limited to the above-mentioned effects, and other effects that are not mentioned may be clearly understood from the descriptions below.

BRIEF DESCRIPTION OF THE DRAWINGS

The above and/or other aspects of the disclosure will be more apparent by describing certain embodiments of the disclosure with reference to the accompanying drawings, in which:

FIG. 4 is a diagram illustrating an example of data transmission or reception in a NAN cluster according to various embodiments;

DETAILED DESCRIPTION

Figure 1:
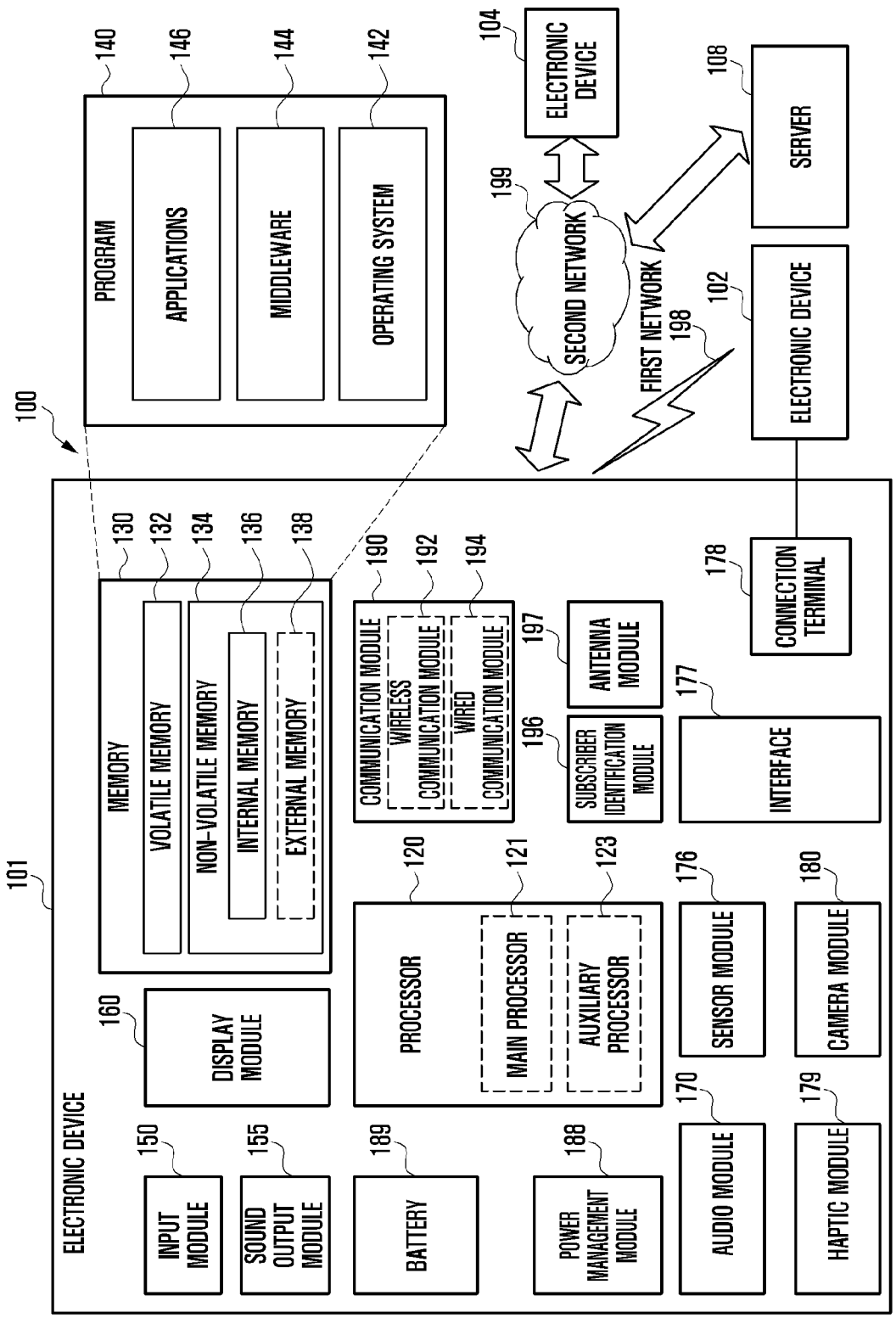
FIG. 1 is a block diagram of an example electronic device according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connection terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his/her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type from, the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
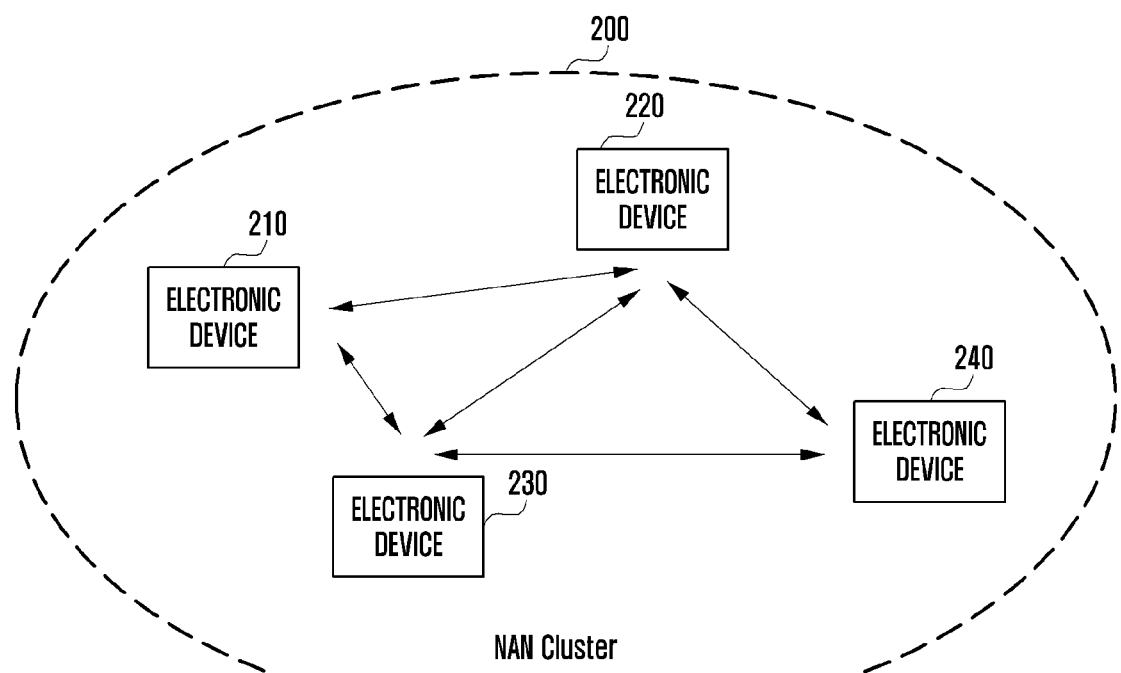
FIG. 2 is a diagram illustrating an example neighbor awareness network (NAN) cluster according to various embodiments.

FIG. 2 is a diagram illustrating an example neighbor awareness network (NAN) cluster according to various embodiments.

For example, FIG. 2 may show a configuration example of a neighbor awareness networking (NAN) cluster 200 for a proximity network according to various embodiments. In the following description, the cluster 200 may refer to a set of electronic devices 210, 220, 230, and 240 in which a proximity network is configured so that the respective electronic devices (or NAN devices) 210, 220, 230, and 240 (e.g., the electronic device 101 of FIG. 1) transmit and receive data to each other. For example, cluster 200 may be referred to as a NAN cluster according to NAN specifications (or standards).

Referring to FIG. 2, the cluster 200 may include multiple electronic devices 210, 220, 230, and 240. The electronic devices 210, 220, 230, and 240 included in the cluster 200 may transmit or receive a beacon (or discovery beacon) and/or a service discovery frame (SDF) (hereinafter, "SDF") within a synchronized time duration (or communication duration) (e.g., discovery (or search) window (discovery window (DW)).

In the electronic devices 210, 220, 230, and 240 in the cluster 200, time clocks may be synchronized with each other. For example, the electronic devices 210, 220, 230, and 240 may be synchronized with a time clock of one electronic device (e.g., the electronic device 210), and may exchange beacons and SDFs with each other in the same discovery window.

According to an embodiment, an electronic device supporting a NAN-based low-power short-range communication technology may broadcast a discovery signal (e.g., beacon) for discovering a different electronic device in each preconfigured first cycle (e.g., about 100 msec), and may perform scanning in each preconfigured second cycle (e.g., about 10 msec) so as to receive a discovery signal broadcast from another electronic device.

The electronic device 210, 220, 230, or 240 may detect at least one other electronic device located around the electronic device, based on the received discovery signal via scanning, and may perform NAN cluster synchronization with the detected at least one other electronic device. The NAN cluster synchronization may include receiving time clock information of the electronic device representing the NAN cluster so that the electronic devices included in the NAN cluster transmit and/or receive data via the same channel and/or during the same time period.

For example, as illustrated in FIG. 2, each of the multiple electronic devices 210, 220, 230, and 240 may transmit a beacon and receive beacons from other electronic devices 210, 220, 230, and 240 so that one cluster 200 operating according to a synchronized time clock may be formed, and the electronic devices 210, 220, 230, and 240 in the cluster 200 may perform NAN cluster synchronization.

The NAN cluster synchronization may be performed based on a channel and time of an electronic device having a highest master preference in the cluster 200. For example, the electronic devices 210, 220, 230, and 240 formed via discovery in the cluster 200 may exchange signals relating to master preference information indicating a preference for operating as an anchor master, and may determine an electronic device, which has a highest master preference, as an anchor master (or master device) via the exchanged signals.

The anchor master may, for example, refer to an electronic device which is a reference for time and channel synchronization of the electronic devices 210, 220, 230, and 240 in the cluster 200. The anchor master may be changed according to the master preference of the electronic device. Each of the time and channel synchronized electronic devices 210, 220, 230, and 240 may transmit a beacon and an SDF and receive beacons and SDFs from other electronic devices in the cluster 200 within a discovery window (or discovery interval) repeated according to a preconfigured cycle. According to an embodiment, beacons may be periodically transmitted or received in each discovery window in order to continuously maintain time and channel synchronization of the electronic devices 210, 220, 230, and 240 in the cluster 200. The SDFs may be transmitted or received in the discovery window as needed to provide a service with the discovered electronic devices 210, 220, 230, and 240. According to an embodiment, the electronic device operating as the anchor master from among the time and channel synchronized electronic devices 210, 220, 230, and 240 may transmit a beacon in an interval between the discovery windows to detect a new electronic device.

Each of the electronic devices 210, 220, 230, and 240 in the cluster 200 may reduce current consumption by operating in an active state only during the discovery window and operating in a low-power state (e.g., a sleep state) during the remaining intervals outside the discovery window.

For example, the discovery window is, for example, a duration (e.g., milliseconds) in which the electronic device is in the active state (or wake state) and is consuming a large amount of current, whereas, in intervals outside the discovery window, the electronic device is in a sleep state in which low-power discovery may be possible.

The electronic devices 210, 220, 230, and 240 in the cluster 200 may be concurrently activated at a start time (e.g., DW start) of the synchronized discovery window, and may be concurrently switched to the sleep state at an end time (e.g., DW end) of the discovery window.

Figure 3:
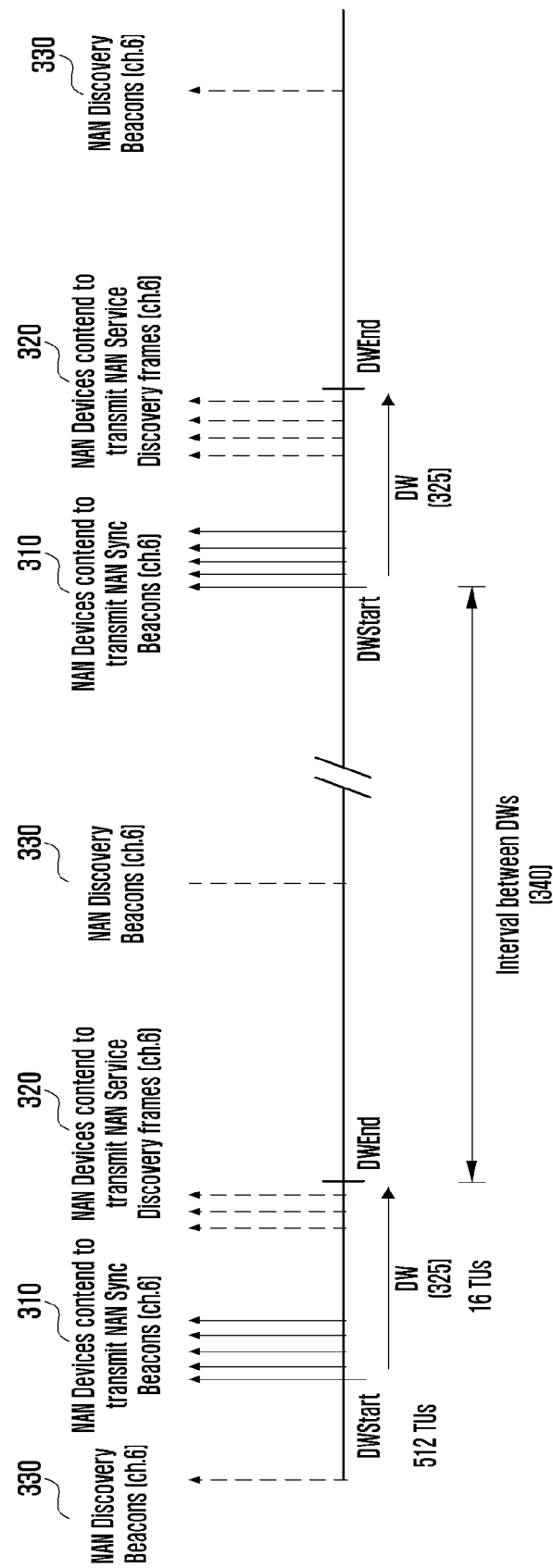
FIG. 3 is a diagram illustrating an example protocol for transmission of a signal of an electronic device included in a NAN cluster according to various embodiments.

The electronic devices 210, 220, 230, and 240 included in the cluster 200 may perform discovery, synchronization, and data exchange using a protocol illustrated in FIG. 3.

FIG. 3 is a diagram illustrating an example protocol for transmission of a signal of an electronic device included in a NAN cluster according to various embodiments.

For example, FIG. 3 may illustrate an example for a discovery window according to various embodiments. FIG. 3 describes an example in which electronic devices included in one cluster transmit signals through a specific channel (e.g., channel 6 (ch6)), based on the NAN standards.

Referring to FIG. 3, the electronic devices included in one cluster may transmit synchronization beacons 310 and SDFs 320 in a synchronized discovery window (DW) 325. A discovery beacon 330 may be transmitted by at least one electronic device in an interval 340 (e.g., an interval between discovery windows) other than the discovery window 325. According to an embodiment, the electronic devices may transmit the synchronization beacon 310 and the SDF 320, based on contention. For example, the synchronization beacon 310 and the SDF 320 may be transmitted based on contention between respective electronic devices belonging to the cluster.

The discovery window 325 may be an interval in which, for data exchange between the respective electronic devices, the electronic devices are activated from a sleep state, which is a power saving mode, to a wake-up state. For example, the discovery window 325 may be divided into time units (TUs) of millisecond units. According to an embodiment, the discovery window 325 for transmission or reception of the synchronization beacon 310 and the SDF 320 may occupy 16 time units (16 TUs) and may have a cycle (or interval) repeated with 512 time units (512 TUs).

The discovery beacon 330 may, for example, refer to a signal transmitted to enable an electronic device, which has not joined the cluster, to discover the cluster. For example, the discovery beacon 330 may be a signal for notification of the presence of the cluster, and electronic devices not participating in the cluster may perform a passive scan and receive the discovery beacon 330 so as to discover and join the cluster.

The discovery beacon 330 may include information necessary for synchronization with the cluster. For example, the discovery beacon 330 may include at least one of a frame control (FC) field indicating a signal function (e.g., beacon), a broadcast address, a media access control (MAC) address of a transmission electronic device, a cluster identifier (ID), a sequence control field, a time stamp for a beacon frame, a beacon interval indicating a transmission interval of the discovery beacon 330, or capability information of the electronic device transmitting the discovery beacon 330.

The discovery beacon 330 may include at least one proximity network (or cluster)-related information element. In an embodiment, the proximity network-related information may be referred to as attribute information.

The synchronization beacon 310 may, for example, refer to a signal for maintaining synchronization between synchronized electronic devices in the cluster. The synchronization beacon 310 may be transmitted by a synchronization device among the electronic devices in the cluster. For example, the synchronization device may include an anchor master electronic device, a master electronic device (master device), or a non-master sync device defined in the NAN standards.

The synchronization beacon 310 may include information necessary for synchronization of the electronic devices within the cluster. For example, the synchronization beacon 310 may include at least one of an FC field indicating a signal function (e.g., beacon), a broadcast address, a MAC address of a transmission electronic device, a cluster identifier, a sequence control field, a time stamp for a beacon frame, a beacon interval indicating an interval between start points of the discovery window 325, or capability information for the transmission electronic device. According to an embodiment, the synchronization beacon 310 may include at least one proximity network (or cluster)-related information element. For example, the proximity network-related information may include contents for a service provided via the proximity network.

The SDF 320 may, for example, refer to a signal for data exchange via the proximity network. According to an embodiment, the SDF 320 may indicate a vendor-specific public action frame, and may include various fields. For example, the SDF 320 may include a category or action field, and may include at least one piece of proximity network-related information.

The synchronization beacon 310, the SDF 320, and the discovery beacon 330 may include proximity network-related information. In an embodiment, the proximity network-related information may include an identifier indicating an information type, an information length, and a body field that includes corresponding information. According to an embodiment, the corresponding information may include at least one of master indication information, cluster information, service identifier list information, service descriptor information, connection capability information, wireless LAN infrastructure information, peer-to-peer (P2P) operation information, independent basic service set (IBSS) information, mesh information, additional proximity network service discovery information, further availability map information, country code information, ranging information, cluster discovery information, or vendor-specific information.

FIG. 4 is a diagram illustrating an example of data transmission or reception in a NAN cluster according to various embodiments.

For example, FIG. 4 describes an example in which a first electronic device 410, a second electronic device 420, and a third electronic device 430 form one cluster via a short-range wireless communication technology, and the respective electronic devices 410, 420, and 430 may transmit or receive beacons and/or SDFs between each other. According to an embodiment, FIG. 4 may provide an example in which the first electronic device 410 among the electronic devices 410, 420, and 430 included in the cluster functions as a master electronic device.

Referring to FIG. 4, the first electronic device 410 may transmit a beacon and an SDF within a discovery window 450. The first electronic device 410 may broadcast a beacon and an SDF in the discovery window 450 that is repeated in each preconfigured interval (e.g., an interval 460).

The second electronic device 420 and the third electronic device 430 may receive the beacon and the SDF which are transmitted by the first electronic device 410. According to an embodiment, each of the second electronic device 420 and the third electronic device 430 may receive the beacon and the SDF broadcast from the first electronic device 410 in each discovery window 450.

The beacon transmitted within the discovery window 450 may include a synchronization beacon, and may include information for maintaining synchronization between the electronic devices 410, 420, and 430. For example, the second electronic device 420 and/or the third electronic device 430 may perform NAN cluster synchronization based on time clock information of the first electronic device 410 operating as the master, the time clock information being included in the beacon transmitted by the first electronic device 410. The second electronic device 420 and/or the third electronic device 430 may be synchronized so that the discovery window 450 may be activated at the same time.

In an interval (e.g., the interval 460) other than the discovery window 450, the electronic devices 410, 420, and 430 may maintain a sleep state to reduce current consumption. For example, the electronic devices 410, 420, and 430 may operate, based on the synchronized time clock, in a wake state only in the discovery window 450 interval so as to reduce current consumption.

Figure 5A:
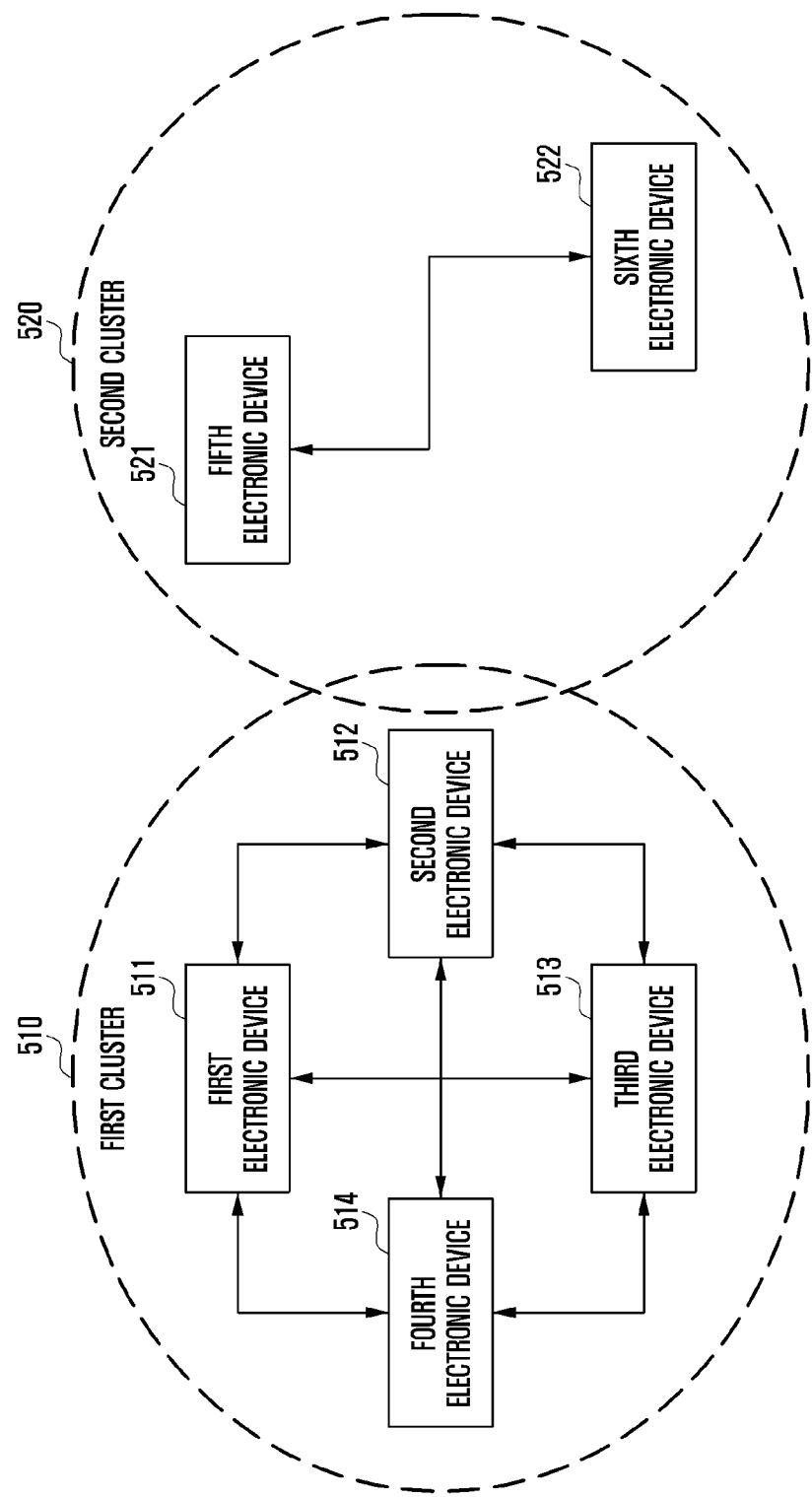
FIG. 5A is a diagram illustrating a first cluster and a second cluster according to various embodiments.

FIG. 5A is a diagram illustrating a first cluster and a second cluster according to various embodiments.

Referring to FIG. 5A, a first cluster 510 may include a first electronic device 511, a second electronic device 512, a third electronic device 513, and/or a fourth electronic device 514. The electronic devices 511, 512, 513, and 514 included in the first cluster may operate according to a synchronized time clock. The electronic devices 511, 512, 513, and 514 may transmit or receive various signals (e.g., a beacon signal and/or a synchronization signal) during an appointed discovery window (e.g., the discovery window 450 of FIG. 4) interval in the first cluster. In order to perform cluster merging of the first cluster 510 and a second cluster 520, which is a cluster other than the first cluster 510, in an interval other than the discovery window, the electronic devices 511, 512, 513, and 514 may scan signals broadcast by electronic devices (e.g., a fifth electronic device 521 and/or a sixth electronic device 522) included in the second cluster 520.

Hereinafter, an embodiment in which the first cluster 510 and the second cluster 520 are merged is described, and for convenience of description, the description is provided based on the first electronic device 511, but other electronic devices (e.g., the second electronic device 512, the third electronic device 513, and/or the fourth electronic device 514) may perform the same operation.

While performing scanning, the first electronic device 511 may receive signals (e.g., a sync beacon signal that is a signal for synchronization of the second cluster 520, or a discovery signal that is a signal for discovery of another cluster) broadcast by the electronic devices 521 and 522 of the second cluster 520. The first electronic device 511 may identify the presence of the second cluster 520, based on information (e.g., attribute information of the second cluster 520) included in signals transmitted by the fifth electronic device 521 and/or the sixth electronic device 522.

The first electronic device 511 may determine whether to merge the first cluster 510 and the second cluster 520. The first electronic device 511 may determine whether to merge the first cluster 510 and the second cluster 520, based on attributes of the second cluster 520, which are included in information included in the signals transmitted by the fifth electronic device 521 and/or the sixth electronic device 522. For example, the first electronic device 511 may compare a cluster grade of the first cluster 510 with a cluster grade of the second cluster 520, which is included in the attributes of the second cluster 520, and may determine to merge the first cluster 510 and the second cluster 520, based on identification that the cluster grade of the second cluster 520 is greater than the cluster grade of the first cluster 510. For another example, the first electronic device 511 may compare the cluster grade of the first cluster 510 with the cluster grade of the second cluster 520, which is included in the attributes of the second cluster 520, and may determine not to merge the first cluster 510 and the second cluster 520, based on identification that the cluster grade of the second cluster 520 is not greater than the cluster grade of the first cluster 510.

The first electronic device 511 may transmit a signal (e.g., a beacon signal or a synchronization signal) including information (e.g., attribute information of the second cluster 520) of a cluster (e.g., the second cluster 520) other than the cluster (e.g., the first cluster 510) to which the first electronic device 511 currently belongs, to other electronic devices (e.g., the second electronic device 512, the third electronic device 513, and/or the fourth electronic device 514) included in the first cluster 510 during the discovery window interval of the first cluster 510, based on the determination to merge the first cluster 510 and the second cluster 520. The other electronic devices 512, 513, and 514 may perform merging into (or joining) the second cluster 520, based on the information transmitted by the first electronic device 511.

Figure 5B:
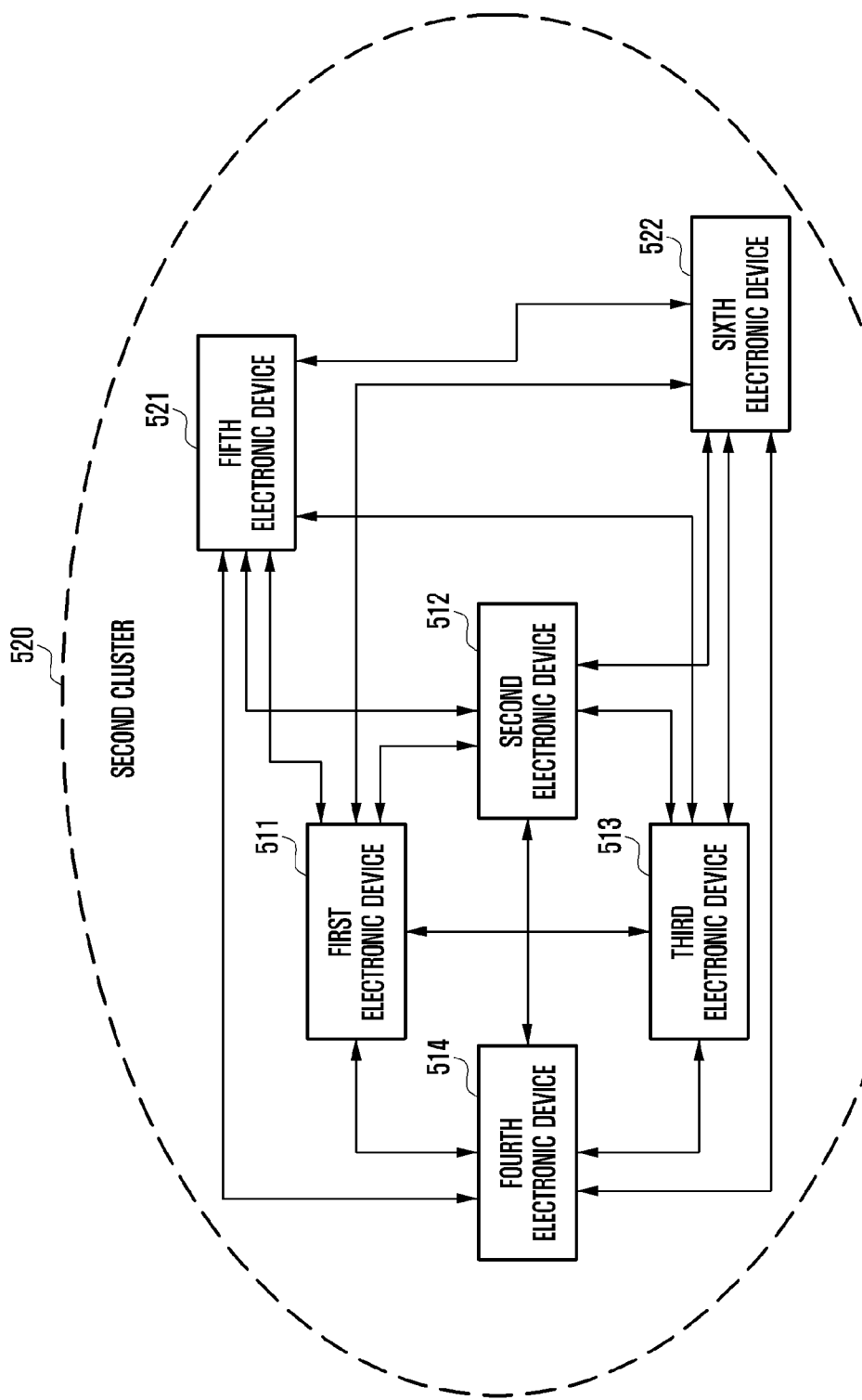
FIG. 5B is a diagram illustrating an example in which a first cluster and a second cluster are merged according to various embodiments.

FIG. 5B is a diagram illustrating an example in which a first cluster and a second cluster are merged according to various embodiments.

Referring to FIG. 5B, the first electronic device 511, the second electronic device 512, the third electronic device 513, and/or the fourth electronic device 514 included in a first cluster (e.g., the first cluster 510 of FIG. 5A) may be merged into the second cluster 520.

The electronic devices 511, 512, 513, 514, 521, and 522 included in the second cluster 520 may operate according to a synchronized time clock. The electronic devices 511, 512, 513, 514, 521, and 522 may transmit or receive various signals (e.g., a beacon signal and/or a synchronization signal) during an appointed discovery window (e.g., the discovery window 450 of FIG. 4) interval in the second cluster.

Figure 5C:
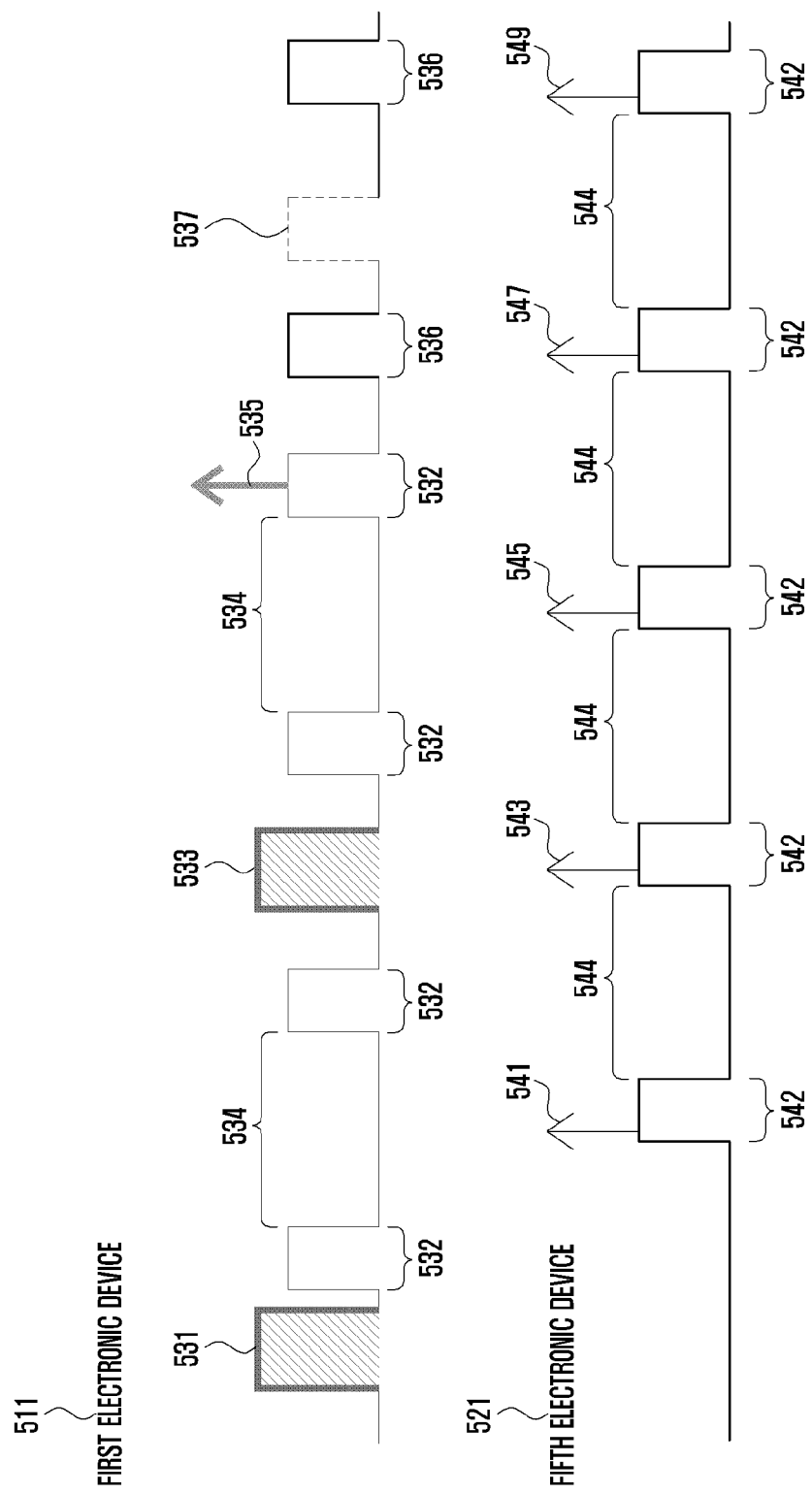
FIG. 5C is a diagram illustrating an example in which an electronic device in a first cluster is merged into a second cluster according to various embodiments.

FIG. 5C is a diagram illustrating an example in which an electronic device in a first cluster is merged into a second cluster according to various embodiments.

Referring to FIG. 5C, a first electronic device (e.g., the first electronic device 511 of FIG. 5A) may operate according to a synchronized time clock of a first cluster (e.g., the first cluster 510 of FIG. 5A). For example, the first electronic device 511 may receive a signal transmitted by an external electronic device or may transmit a signal to an external electronic device during a discovery window 532 (e.g., the discovery window 450 of FIG. 4) interval. The first electronic device 511 may not transmit and/or receive a signal by operating in a low power state (e.g., a sleep state) during an interval 534 other than the discovery window 532. For discovery of a second cluster (e.g., the second cluster 520 of FIG. 5A) other than the first cluster 510, the first electronic device 511 may perform scanning during scanning intervals 531 and 533 which are intervals other than the discovery window 532. Durations of the scanning intervals 531 and 533 may be configured according to various schemes. The durations of the scanning intervals 531 and 533 may be configured in consideration of a cycle of a signal broadcast by an electronic device (e.g., the fifth electronic device 521) included in the second cluster 520. The first electronic device 511 may configure the durations of the scanning intervals 531 and 533 so as to receive a signal broadcast by the fifth electronic device 521. According to an embodiment, the durations of the scanning intervals 531 and 533 may be the same as the cycle of the signal broadcast by the fifth electronic device 521 or may be greater than the cycle of the broadcast signal by a specified duration (e.g., 10 ms). The first electronic device 511 may receive a signal broadcast by the electronic device (e.g., the fifth electronic device 521) included in the second cluster 520 while performing scanning.

Referring to FIG. 5C, the fifth electronic device 521 may operate according to a synchronized time clock of the second cluster 520. For example, the fifth electronic device 521 may receive a signal transmitted by an external electronic device or may transmit a signal to an external electronic device during a discovery window 542. Signals 541, 543, 545, 547, and 549 transmitted by the fifth electronic device 521 during the discovery window 541 may include information (e.g., attribute information of the second cluster) of the second cluster 520. The fifth electronic device 521 may not transmit and/or receive a signal by operating in a low power state (e.g., a sleep state) during an interval 544 other than the discovery window 542.

The first electronic device 511 may not receive the signals 541, 543, 545, 547, and 549 transmitted by the fifth electronic device 521 during the scanning interval 531. During the subsequent scanning interval 533, the first electronic device 511 may receive the signal 543 transmitted by the fifth electronic device 521 and may discover the second cluster 520.

The first electronic device 511 may determine whether to merge the first cluster 510 and the second cluster 520. The first electronic device 511 may determine whether to merge the first cluster 510 and the second cluster 520, based on the attributes of the second cluster 520, which are included in information included in the signal transmitted by the fifth electronic device 521. For example, the first electronic device 511 may compare a cluster grade of the first cluster 510 with a cluster grade of the second cluster 520, which is included in the attributes of the second cluster 520, and may determine to merge the first cluster 510 and the second cluster 520, based on identification that the cluster grade of the second cluster 520 is greater than the cluster grade of the first cluster 510.

The first electronic device 511 may transmit a signal 535 (e.g., a beacon signal or a synchronization signal) including information (e.g., attribute information of the second cluster 520) of a cluster (e.g., the second cluster 520) other than the cluster (e.g., the first cluster 510) to which the first electronic device 511 currently belongs, to other electronic devices (e.g., the second electronic device 512, the third electronic device 513, and/or the fourth electronic device 514) included in the first cluster 510 as many times as a designated number (e.g., once) during the discovery window 532 interval of the first cluster 510, based on the determination to merge the first cluster 510 and the second cluster 520. The designated number of times may be configured according to various schemes. FIG. 5C illustrates that a signal is broadcast once during one discovery window 532 interval, but the number of signal transmissions is not limited.

The first electronic device 511 may transmit the signal 535 including information of the second cluster 520, and then may perform a series of operations to synchronize with the second cluster 520. After synchronization with the second cluster 520, the first electronic device 511 may operate according to the synchronized time clock of the second cluster 520. The first electronic device 511 may receive a signal transmitted by an external electronic device or may transmit a signal to an external electronic device during a discovery window 536 (e.g., the discovery window 450 of FIG. 4) interval. A start time, a duration, and/or an interval of the discovery window 536 may be the same as those of the discovery window 542 of the second cluster 520. After synchronization with the second cluster 520, the first electronic device 511 may not be synchronized with the first cluster 510. According to an example, the first electronic device 511 may maintain an inactive state during a discovery window 537 interval of the first cluster 510.

Referring to FIG. 5C, it may take considerable time for the first electronic device 511 to discover the second cluster 520. For example, if the first electronic device 511 fails to discover the second cluster 520 during the scanning intervals 531 and 533, the first cluster 510 and the second cluster 520 cannot be merged, so that latency for a service within the cluster may increase and/or a service quality may deteriorate. If the scanning intervals 531 and 533 are increased, power consumption of the first electronic device 511 may increase.

Hereinafter, descriptions will be provided for an embodiment in which the electronic devices 511, 512, 513, and 514 in the first cluster 510 collaborate to discover another cluster, thereby reducing the time required for cluster merging.

Figure 6:
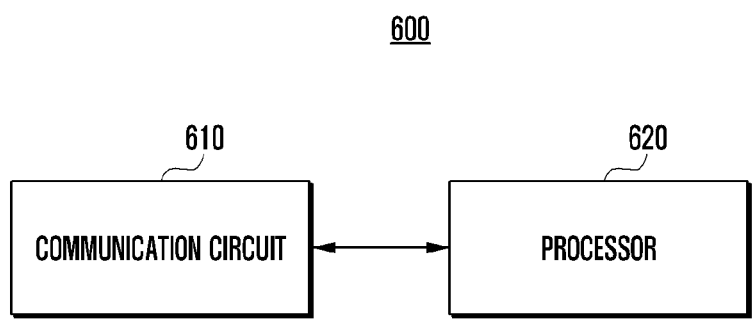
FIG. 6 is a diagram illustrating an example electronic device according to various embodiments.

FIG. 6 is a diagram illustrating an example electronic device according to various embodiments.

According to various embodiments, an electronic device 600 (e.g., the first electronic device 511 of FIG. 5A) may include a communication circuit 610 (e.g., the wireless communication module 192 of FIG. 1), and a processor 620 (e.g., the processor 120 of FIG. 1).

The communication circuit 610 may include various circuit structures used for modulation and/or demodulation of a signal in the electronic device 600. For example, the communication circuit 610 may modulate a baseband signal into a radio frequency (RF) band signal so as to output the same through an antenna (not illustrated), or may demodulate an RF band signal received through the antenna into a baseband signal so as to transmit the same to the processor 620.

The communication circuit 610 may transmit or receive various data to or from an external electronic device (e.g., the second electronic device 512, the third electronic device 513, and/or the fourth electronic device 514 of FIG. 5A) through a frequency band (e.g., 2.4 GHz, 5 GHz, and/or 6 GHz) used by electronic devices of a NAN cluster (e.g., the first cluster 510 of FIG. 5A).

The processor 620 may receive data transmitted by an application processor (e.g., the processor 120 of FIG. 1) and generate a packet for transmission of the received data to an external electronic device (e.g., the second electronic device 512, the third electronic device 513, and/or the fourth electronic device 514 of FIG. 5A). The processor 620 (including, e.g., processing circuitry) may, for example, be defined to be a communication processor included in a communication module (e.g., the wireless communication module 192 of FIG. 1). According to an embodiment, the processor 620 may generate (or, create, produce or configure) a packet by performing channel coding based on data transmitted by an application processor (e.g., the application processor 120 of FIG. 1), may identify whether at least part of data transmitted by the external electronic device 410 has an error, or may perform error recovery (e.g., hybrid auto repeat request (HARQ)) if an error occurs.

Based on NAN cluster information included in a signal broadcast by the external electronic device 512, 513, or 514 included in a cluster (or network) (e.g., the first cluster 510 of FIG. 5A) implemented in a neighbor awareness networking (NAN) scheme, the processor 620 may perform synchronization with the NAN cluster. Alternatively, the processor 620 may receive NAN cluster information via a communication scheme (e.g., short-range wireless communication including Bluetooth or Wi-Fi) other than a NAN-based communication scheme. For example, the processor 620 may transmit a probe request signal for discovering an external electronic device (e.g., the second electronic device 512, the third electronic device 513, and/or the fourth 514 in FIG. 5A) to be connected via Wi-Fi, and may perform NAN cluster synchronization based on NAN cluster information included in a probe response message transmitted by the external electronic device (e.g., the second electronic device 512, the third electronic device 513, and/or the fourth 514 in FIG. 5A) in response to the probe request signal.

The NAN cluster synchronization may include receiving time clock information of an electronic device (or a master device of the NAN cluster) (e.g., the first electronic device 410 of FIG. 4) representing the NAN cluster so that electronic devices included in the NAN cluster transmit and/or receive data on the same channel and/or during the same time. For example, the processor 620 may receive a beacon broadcast by the external electronic device (e.g., the second electronic device 512, the third electronic device 513, and/or the fourth 514 in FIG. 5A) and may perform NAN cluster synchronization based on time clock information of the external electronic device (e.g., the second electronic device 512, the third electronic device 513, and/or the fourth 514 in FIG. 5A), which is included in the beacon.

After the NAN cluster synchronization is completed, the processor 620 may activate the communication circuit 610 in each designated interval (e.g., a size of a discovery window with an interval having a first value) and may receive data transmitted by the external electronic devices (e.g., the second electronic device 512, the third electronic device 513, and/or the fourth 514 in FIG. 5A) included in the first cluster 510 in each designated interval or may transmit data to the external electronic devices (e.g., the second electronic device 512, the third electronic device 513, and/or the fourth 514 in FIG. 5A).

The processor 620 may perform, after completion of the NAN cluster synchronization or as a part of the NAN cluster synchronization, configuration related to scanning to search for another cluster for cluster merging. The another cluster may NAN cluster to which the electronic device 600 does not belong. Alternatively, the processor 620 may perform, separately from the NAN cluster synchronization, configuration related to scanning to search for another cluster for cluster merging. The configuration of scanning may be initiated and performed by an electronic device supporting scanning from among the electronic devices (e.g., the electronic device 600, and the second electronic device 512, the third electronic device 513, and/or the fourth 514 of FIG. 5A) included in the first cluster 510. For convenience of description, it is described that the electronic device 600 performs the configuration of scanning. Scanning may be performed together with electronic devices capable of searching for another cluster.

The processor 620 may determine a maximum number of electronic devices to perform scanning. The maximum number of electronic devices to perform scanning may be determined according to various schemes. The number of electronic devices to perform scanning may be determined according to a type of a service performed by the electronic device 600. According to an embodiment, if the service performed by the electronic device 600 is a service requiring low latency, the processor 620 may increase the maximum number of electronic devices to perform scanning in comparison with a service that can be performed with relatively high latency.

The processor 620 may search for at least one external electronic device (e.g., the second electronic device 512, the third electronic device 513, and/or the fourth 514) capable of supporting scanning to search for another cluster.

According to an embodiment, the processor 620 may control the communication circuit 610 to transmit a signal including identification information of scanning to search for another cluster.

An external electronic device supporting scanning (for convenience of description, it is assumed that the second electronic device 512 supports scanning) from among the external electronic devices (e.g., the second electronic device 512, the third electronic device 513, and/or the fourth 514) may transmit a response message corresponding to the signal. The response message may be a signal for requesting configuration information related to scanning to search for another cluster. Alternatively, the response message may be a signal for requesting participation in scanning to search for the second cluster 520. Alternatively, the response message may be a signal for accepting participation in scanning to search for the second cluster 520, in response to the electronic device 600 transmitting the signal for requesting participation in scanning to search for the second cluster 520. Upon reception of the response message, when performing configuration related to scanning, the processor 610 may perform configuration related to scanning of the second electronic device 512, which includes a start time for scanning to be performed by the second electronic device 512, a duration of a scanning interval, and/or a scanning cycle, and may perform configuration related to scanning of the electronic device 600, which includes a start time for scanning to be performed by the electronic device 600, a duration of a scanning interval, and/or a scanning cycle. The configuration information may be referred to a setting information or scanning information.

The duration of the scanning interval of the electronic device 600 may be substantially the same as the duration of the scanning interval of the second electronic device 512, and the scanning cycle of the electronic device 600 may be substantially the same as the scanning cycle of the second electronic device 512. However, the disclosure is not limited thereto, and the interval durations and/or cycles of scanning of the electronic device 600 and the second electronic device 512 may be configured according to various situations.

The processor 620 may perform configuration related to scanning so that the electronic device 600 and the second electronic device 512 may perform scanning to search for another cluster at different times. The processor 620 may perform configuration so that an interval of scanning to be performed by the electronic device 600 and an interval of scanning to be performed by the second electronic device 512 are different. For example, the processor 620 may configure the scanning interval of the electronic device 600 so that the electronic device 600 performs scanning between a zeroth discovery window and a first discovery window among 16 discovery windows. The processor 620 may configure the scanning interval of the second electronic device 512 so that the second electronic device 512 performs scanning between an eighth discovery window and a ninth discovery window among 16 discovery windows.

The processor 620 may perform configuration so that a start time for scanning to be performed by the electronic device 600 and a start time for scanning to be performed by the second electronic device 512 are different. For example, the processor 620 may configure the start time for scanning of the electronic device 600 so that the electronic device 600 performs scanning between the zeroth discovery window and the first discovery window among 16 discovery windows. The processor 620 may configure the start time for scanning of the second electronic device 512 so that the second electronic device 512 performs scanning between an eighth discovery window and a ninth discovery window among 16 discovery windows.

When performing configuration so that the scanning interval to be scanned by the electronic device 600 and the scanning interval of the second electronic device 512 are different, the processor 620 may increase a reception probability of signals broadcast by electronic devices (e.g., the fifth electronic device 521 and/or the sixth electronic device 522) included in a cluster (e.g., the second cluster 520) other than the first cluster 510, by configuring the scanning interval to be scanned by the electronic device 600 and the scanning interval of the second electronic device 512 to be separated as far as possible in time. Alternatively, when performing configuration so that the scanning interval to be scanned by the electronic device 600 and the scanning interval of the second electronic device 512 are different, the processor 620 may reduce a time required for receiving signals broadcast by electronic devices (e.g., the fifth electronic device 521 and/or the sixth electronic device 522) included in another cluster (e.g., the second cluster 520), by configuring the scanning interval to be scanned by the electronic device 600 and the scanning interval of the second electronic device 512 to be separated as far as possible in time. According to an embodiment, the processor 620 may configure the scanning interval of the second electronic device 512 so that the second electronic device 512 performs scanning at a time point that is substantially the same as a time point corresponding to a half of the scanning cycle of the electronic device 600.

The processor 620 may generate (or, create, produce or configure) first configuration information associated with scanning to search for another cluster for the electronic device 600 and/or the second electronic device 512. The first configuration information may include the start time for scanning, execution cycle of scanning, and/or the duration of the scanning interval for the electronic device 600 and/or the second electronic device 512.

The start time, execution cycle, and/or interval duration of scanning may be defined in various ways. According to an embodiment, the start time, execution cycle, and/or interval duration of scanning may be expressed in one discovery window (discovery window) unit. For example, the start time for scanning may be expressed so that scanning starts between first discovery window DW0 and second discovery window DW1, and the execution cycle may be expressed so that scanning is performed in every 16 discovery windows. The start time for scanning may be expressed in a bitmap manner.

The first configuration information may include information to enable the second electronic device 512 to perform a scanning to search for another cluster at a time point which is different from a time point at which the electronic device 600 performs scanning to search for another cluster. The information to enable the second electronic device 512 to perform a scanning to search for another cluster at a time point which is different from a time point at which the electronic device 600 performs scanning to search for another cluster may includes the start time for scanning, execution cycle of scanning, and/or the duration of the scanning interval for the second electronic device 512.

The processor 620 may control the communication circuit 610 to transmit the first configuration information to the second electronic device 512. The first configuration information may be transmitted in various schemes. According to an embodiment, the first configuration information may be included in a publish message of a service discovery frame (SDF) defined in NAN so as to be transmitted, but the disclosure is not limited thereto.

The processor 620 may receive a signal for requesting participation in scanning to search for the second cluster 520, which is transmitted by the second electronic device 512, before transmission of a signal including identification information of scanning to search for another cluster. In response to receiving the signal for requesting participation in scanning to search for the second cluster 520, which is transmitted by the second electronic device 512, the processor 620 may control the communication circuit 610 to transmit, to the second electronic device 512, the first configuration information associated with scanning to search for the second cluster 520. The first configuration information may include the start time for scanning, scanning cycle, and/or duration of the scanning interval for the electronic device 600. The processor 620 may receive an assignment request message for scanning, which is transmitted by the second electronic device 512, and may configure the start time for scanning, scanning cycle, and/or duration of the scanning interval for the second electronic device 512. The processor 620 may control the communication circuit 610 to transmit, to the second electronic device 512, the first configuration information including the start time for scanning, scanning cycle, and/or duration of the scanning interval for the second electronic device 512. If the processor 620 configure the start time for scanning, scanning cycle, and/or duration of the scanning interval for the second electronic device 512, the first configuration information being received by the second electronic device 512 may not include the start time for scanning, scanning cycle, and/or duration of the scanning interval for the electronic device 600.

In the aforementioned embodiment, it has been described that the electronic device 600 performs configuration related to scanning of the second electronic device 512, but the second electronic device 512 that is not the electronic device 600 may perform configuration related to scanning.

In response to receiving the signal for requesting participation in scanning to search for the second cluster 520, which is transmitted by the second electronic device 512, the processor 620 may control the communication circuit 610 to transmit, to the second electronic device 512, the first configuration information associated with scanning to search for the second cluster 520. The first configuration information may include the start time for scanning, scanning cycle, and/or duration of the scanning interval for the electronic device 600. The second electronic device 512 may configure the start time for scanning, scanning cycle, and/or duration of the scanning interval for the second electronic device 512 so that the scanning interval of the electronic device 600 and the scanning interval of the second electronic device 512 do not overlap. The second electronic device 512 may transmit, to the electronic device 600, second configuration information including the start time for scanning, scanning cycle, and/or duration of the scanning interval for the second electronic device 512. The processor 620 may change (or update) the first configuration information, based on the second configuration information. According to an embodiment, the processor 620 may change (or update) the first configuration information in a scheme of adding, to the first configuration information, the start time for scanning, scanning cycle, and/or duration of the scanning interval for the second electronic device 512, which are included in the second configuration information.

The second electronic device 512 having received the first configuration information may perform scanning to search for the second cluster 520, based on the start time for scanning, execution cycle of scanning, and/or duration of the scanning interval for the second electronic device 512, which are included in the first configuration information.

The processor 620 may control the communication circuit 610 so that scanning to search for the second cluster 520 is performed based on the first configuration information. The processor 620 may control the communication circuit 610 to receive signals broadcast by electronic devices (e.g., the fifth electronic device 521 and/or the sixth electronic device 522 of FIG. 5A) included in the second cluster 520, based on the first configuration information.

While performing scanning, the processor 620 may receive, via the communication circuit 610, signals (e.g., a sync beacon signal that is a signal for synchronization of the second cluster 520, or a discovery signal that is a signal for discovery of another cluster) broadcast by the electronic devices 521 and 522 of the second cluster 520. The electronic device 600 may identify the presence of the second cluster 520, based on information (e.g., attribute in formation of the second cluster 520) included in signals transmitted by the fifth electronic device 521 and/or the sixth electronic device 522. The processor 620 may receive information indicating that the second electronic device 512 has discovered the second cluster 520, from the second electronic device 512 via the communication circuit 610.

The processor 620 may determine whether to merge the first cluster 510 and the second cluster 520. The processor 620 may determine whether to merge the first cluster 510 and the second cluster 520, based on attributes of the second cluster 520, which are included in information included in the signals transmitted by the fifth electronic device 522 and/or the sixth electronic device 512, or attributes of the second cluster 520, which are included in information transmitted by the second electronic device 512. For example, the processor 620 may compare a cluster grade of the first cluster 510 with a cluster grade of the second cluster 520, which is included in the attributes of the second cluster 520, and may determine to merge the first cluster 510 and the second cluster 520, based on identification that the cluster grade of the second cluster 520 is greater than the cluster grade of the first cluster 510. For another example, the processor 620 may compare the cluster grade of the first cluster 510 with the cluster grade of the second cluster 520, which is included in the attributes of the second cluster 520, and may determine not to merge the first cluster 510 and the second cluster 520, based on identification that the cluster grade of the second cluster 520 is not greater than the cluster grade of the first cluster 510.

The processor 620 may transmit information to other electronic devices (e.g., the second electronic device 512, the third electronic device 513, and/or the fourth electronic device 514) included in the first cluster 510 based on the determination to merge the first cluster 510 and the second cluster 520, the information may enable to perform the operations for merging the first cluster 510 and the second cluster 520. The processor 620 may transmit a signal (e.g., a beacon signal or a synchronization signal) including information (e.g., attribute information of the second cluster 520) of a cluster (e.g., the second cluster 520) other than the cluster (e.g., the first cluster 510) to which the first electronic device 600 currently belongs, to other electronic devices (e.g., the second electronic device 512, the third electronic device 513, and/or the fourth electronic device 514) included in the first cluster 510 during the discovery window interval of the first cluster 510. The other electronic devices 512, 513, and 514 may perform merging into (or joining) the second cluster 520, based on the information transmitted by the electronic device 600.

In the aforementioned embodiment, it has been described that the electronic device 600 and the second electronic device 512 perform scanning to search for the second cluster 520, but other electronic devices may also participate in scanning.

In response to receiving a signal for requesting participation in scanning to search for the second cluster 520, which is transmitted by the third electronic device 513, the processor 620 may control the communication circuit 610 to transmit, to the third electronic device 513, the first configuration information associated with scanning to search for the second cluster 520. The first configuration information may include the start times of scanning, scanning cycles, and/or durations of the scanning intervals for the electronic device 600 and the second electronic device 512. The processor 620 may receive an assignment request message for scanning, which is transmitted by the third electronic device 513, and may configure the start time for scanning, scanning cycle, and/or duration of the scanning interval for the third electronic device 513. The processor 620 may configure the start time for scanning, scanning cycle, and/or duration of the scanning interval for the third electronic device 513 so that the scanning interval of the electronic device 600, the scanning interval of the second electronic device 512, and the scanning interval of the third electronic device 513 do not overlap. The processor 620 may control the communication circuit 610 to transmit, to the third electronic device 513, first configuration information including the start time for scanning, scanning cycle, and/or duration of the scanning interval for the third electronic device 513. In an embodiment, the second electronic device 512 may receive, from the electronic device 600, the first configuration information including the start time for scanning, scanning cycle, and/or duration of the scanning interval for the third electronic device 513.

In response to receiving a signal for requesting participation in scanning to search for the second cluster 520, which is transmitted by the third electronic device 513, the processor 620 may control the communication circuit 610 to transmit, to the third electronic device 513, the first configuration information associated with scanning to search for the second cluster 520. The first configuration information may include the start times of scanning, scanning cycles, and/or durations of the scanning intervals for the electronic device 600 and the second electronic device 512. The third electronic device 513 may configure the start time for scanning, scanning cycle, and/or duration of the scanning interval for the third electronic device 513 so that the scanning interval of the electronic device 600, the scanning interval of the second electronic device 512, and the scanning interval of the third electronic device 513 do not overlap. The third electronic device 513 may transmit, to the electronic device 600, the third configuration information including the start time for scanning, scanning cycle, and/or duration of the scanning interval for the third electronic device 513. The processor 620 may change (or update) the first configuration information, based on the third configuration information. According to an embodiment, the processor 620 may change (or update) the first configuration information in a scheme of adding, to the first configuration information, the start time for scanning, scanning cycle, and/or duration of the scanning interval for the third electronic device 513, which are included in the third configuration information.

Based on the scheme described above, one or more electronic devices (e.g., the electronic device 600, the second electronic device 512, and/or the third electronic device 513) included in the first cluster 510 may perform scanning to search for the second cluster 520 at different times. Accordingly, even if one electronic device (e.g., the electronic device 600) fails to discover the second cluster 520 during the scanning interval, the second cluster 520 may be discovered by another electronic device (e.g., the second electronic device 512 and/or the third electronic device 513). Therefore, since the electronic device 600 may discover the second cluster 520 and/or perform merging even without configuring a long scanning interval, a smooth NAN communication-based service can be performed even without increasing current consumption.

Figure 7:
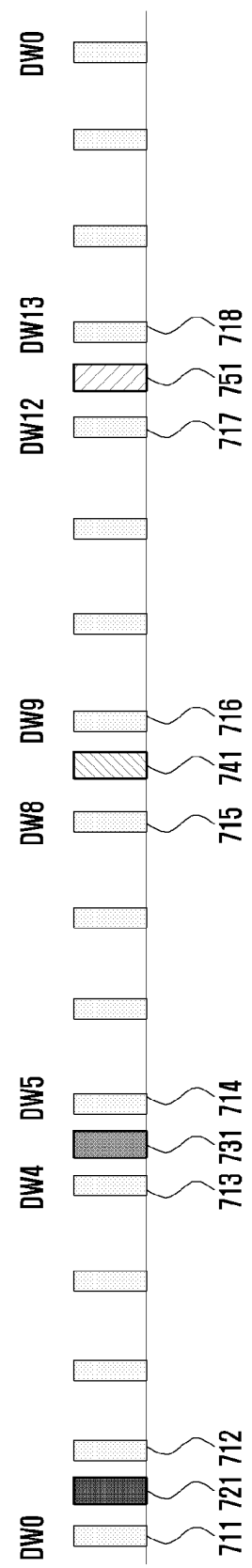
FIG. 7 is a diagram illustrating an embodiment in which a first electronic device, a second electronic device, a third electronic device, and/or a fourth electronic device perform scanning to search for another cluster according to various embodiments.

FIG. 7 is a diagram illustrating an embodiment in which a first electronic device, a second electronic device, a third electronic device, and/or a fourth electronic device perform scanning to search for another cluster according to various embodiments.

Referring to FIG. 7, a first electronic device (e.g., the electronic device 600 of FIG. 6) may configure start times, cycles, and/or durations of scanning intervals for scanning of external electronic devices (e.g., the second electronic device 512, the third electronic device 513, and/or the fourth electronic device 514 of FIG. 5A) participating in scanning to search for a second cluster (e.g., the second cluster 520 of FIG. 5A).

The first electronic device 600 may configure a cycle of scanning to search for the second cluster 520 to be 16 discovery window intervals. The electronic devices 600, 512, 513, and 514 participating in scanning may perform scanning in every 16 discovery window intervals.

The first electronic device 600 may configure a scanning interval for searching for the second cluster 520. According to an embodiment, the first electronic device 600 may configure a scanning interval to be shorter than a duration between discovery window intervals. The electronic devices 600, 512, 513, and 514 participating in scanning may perform scanning during the scanning interval having the configured duration.

The first electronic device 600 may determine a maximum number of electronic devices to perform scanning. The maximum number of electronic devices to perform scanning may be determined according to various schemes. The number of electronic devices to perform scanning may be determined according to a type of a service performed by the first electronic device 600. According to an embodiment, if the service performed by the first electronic device 600 is a service requiring low latency, the first electronic device 600 may increase the maximum number of electronic devices to perform scanning in comparison with a service that can be performed with relatively high latency. In FIG. 7, descriptions are provided on the assumption that the maximum number is 4.

The first electronic device 600 may determine intervals to be scanned from among 16 discovery windows DW0 to DW15. In order to increase a reception probability of signals broadcast by the electronic devices (e.g., the fifth electronic device 521 and/or the sixth electronic device 522 of FIG. 5A) included in another cluster (e.g., the second cluster 520 of FIG. 5A), the first electronic device 600 may determine intervals for scanning so that scanning intervals of the electronic devices to perform scanning are separated from each other as far as possible. Referring to FIG. 7, the first electronic device 600 may determine, as the intervals to be scanned, an interval 721 between first window DW0 711 and second window DW1 712, an interval 731 between fifth window DW4 713 and sixth window DW5 714, an interval 741 between ninth window DW8 715 and tenth window DW9 716, and an interval 751 between thirteenth window DW12 717 and fourteenth window DW13 718.

The first electronic device 600 may configure the scanning interval 721 of the electronic device 600 so that scanning is performed between first window DW0 711 and second window DW1 712 among 16 discovery windows DW0 to DW15.

The first electronic device 600 may configure a start time for scanning of the second electronic device 512, based on reception of a signal for requesting participation in scanning to search for the second cluster 520, which is transmitted by the second electronic device 512.

The first electronic device 600 may perform configuration so that a scanning interval to be scanned by the first electronic device 600 and a scanning interval to be scanned by the second electronic device 512 are separated from each other as far as possible in time. The first electronic device 600 may configure the scanning interval 741 of the second electronic device 512 so that the second electronic device 512 may perform scanning between ninth discovery window DW8 715 and tenth discovery window DW9 712 among 16 discovery windows DW0 to DW15.

The first electronic device 600 may configure a start time for scanning of the third electronic device 513, based on reception of a signal for requesting participation in scanning to search for the second cluster 520, which is transmitted by the third electronic device 513.

The first electronic device 600 may configure a start time for scanning of the third electronic device 513 so that the scanning interval 721 to be scanned by the first electronic device 600, the scanning interval 741 to be scanned by the second electronic device 512, and the scanning interval to be scanned by the third electronic device 513 are separated from each other as far as possible in time. The first electronic device 600 may configure the scanning interval 731 of the third electronic device 513 so that the third electronic device 513 may perform scanning between fifth discovery window DW4 713 and sixth discovery window DW5 714 among 16 discovery windows DW0 to DW15.

The first electronic device 600 may configure a start time for scanning of the fourth electronic device 514, based on reception of a signal for requesting participation in scanning to search for the second cluster 520, which is transmitted by the fourth electronic device 514.

The first electronic device 600 may configure the scanning interval of the fourth electronic device 514 so that the scanning interval 721 to be scanned by the first electronic device 600, the scanning interval 741 to be scanned by the second electronic device 512, the scanning interval 731 to be scanned by the third electronic device 513, and the scanning interval of the fourth electronic device 514 are separated from each other as far as possible in time. The first electronic device 600 may configure the scanning interval 751 of the fourth electronic device 514 so that the fourth electronic device 514 may perform scanning between thirteenth discovery window DW12 717 and fourteenth discovery window DW13 718 among 16 discovery windows DW0 to DW15.

Figure 8:
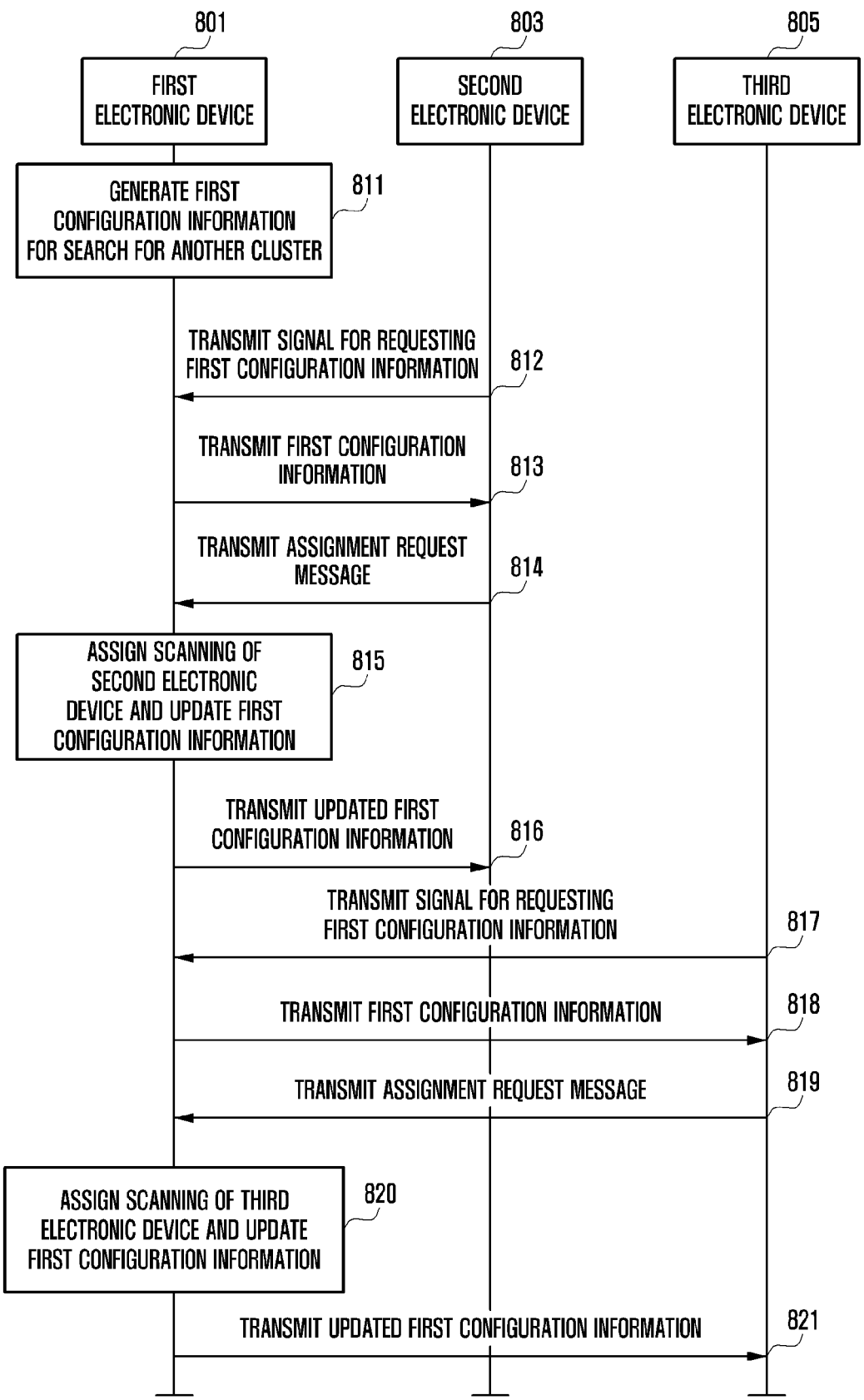
FIG. 8 is a diagram illustrating an example in which a first electronic device assigns scanning of a second electronic device and/or a third electronic device according to various embodiments.

FIG. 8 is a diagram illustrating an example in which a first electronic device assigns scanning of a second electronic device and/or a third electronic device according to various embodiments.

Referring to FIG. 8, a first electronic device 801 (e.g., the electronic device 600 of FIG. 6), a second electronic device 803 (e.g., the second electronic device 512 of FIG. 5A), and/or a third electronic device 805 (e.g., the third electronic device 513 of FIG. 5A) may be included in the same cluster (e.g., the first cluster 510 of FIG. 5A).

In operation 811, the first electronic device 801 may generate (or, create, produce or configure) first configuration information for searching for another cluster (e.g., the second cluster 520 of FIG. 5A).

The first configuration information may be generated at various times. The first electronic device 801 may be a master device of the first cluster 510, and may generate (or, create, produce or configure) the first configuration information when generating the first cluster 510 or when participating in the first cluster 510. The first electronic device 801 may be a non-master device of the first cluster 510, and may generate (or, create, produce or configure) the first configuration information when participating in the first cluster 510. The first electronic device 801 may generate (or, create, produce or configure) the first configuration information in various situations of requesting to search for another cluster 520.

The first configuration information may include a start time for scanning, an execution cycle of scanning, and/or a duration of a scanning interval for the first electronic device 801.

The start time, execution cycle, and/or interval duration of scanning may be defined in various ways. According to an embodiment, the start time, execution cycle, and/or interval duration of scanning may be expressed in one discovery window (discovery window) unit. For example, the start time for scanning may be expressed so that scanning starts between first discovery window DW0 and second discovery window DW1, and the execution cycle may be expressed so that scanning is performed in every 16 discovery windows. The start time for scanning may be expressed in a bitmap manner.

In operation 812, the second electronic device 803 may transmit, to the first electronic device 801, a signal for requesting the first configuration information.

In operation 813, the first electronic device 801 may transmit the first configuration information to the second electronic device 802 in response to reception of the request signal.

The first configuration information may be transmitted in various schemes. According to an embodiment, the first configuration information may be included in a publish message of a service discovery frame (SDF) defined in NAN so as to be transmitted, but the disclosure is not limited thereto.

In operation 814, the second electronic device 803 may transmit, to the first electronic device 801, a message for requesting assignment of scanning.

Requesting assignment may include requesting to assign a start time, a scanning cycle, and/or a duration of a scanning interval for scanning to be performed by the second electronic device 803. In operation 815, the first electronic device 801 may assign scanning of the second electronic device 803 and may update the first configuration information, based on the assigned scanning of the second electronic device 803.

The first electronic device 801 may receive the assignment request message for scanning, which is transmitted by the second electronic device 803, and may configure the start time for scanning, scanning cycle, and/or duration of the scanning interval for the second electronic device 803.

The first electronic device 801 may perform configuration related to scanning so that the first electronic device 801 and the second electronic device 803 may perform scanning to search for another cluster at different times. The first electronic device 801 may perform configuration so that the scanning interval to be scanned by the first electronic device 801 and the scanning interval to be scanned by the second electronic device 803 are different. For example, if the scanning interval of the first electronic device 801 is configured so that the first electronic device 801 performs scanning between a zeroth discovery window and a first discovery window among 16 discovery windows, the first electronic device 801 may configure the scanning interval of the second electronic device 803 so that the second electronic device 803 performs scanning between an eighth discovery window and a ninth discovery window among the 16 discovery windows.

The first electronic device 801 may perform configuration so that the start time for scanning to be performed by the first electronic device 801 and the start time for scanning to be performed by the second electronic device 803 are different. For example, the first electronic device 801 may configure the start time for scanning of the electronic device 801 so that the first electronic device 801 performs scanning between the zeroth discovery window and the first discovery window among the 16 discovery windows. The first electronic device 801 may configure the start time for scanning of the second electronic device 803 so that the second electronic device 803 performs scanning between the eighth discovery window and the ninth discovery window among the 16 discovery windows.

Alternatively, when performing configuration so that the scanning interval to be scanned by the electronic device 801 and the scanning interval of the second electronic device 803 are different, the first electronic device 801 may increase a reception probability of signals broadcast by electronic devices (e.g., the fifth electronic device 521 and/or the sixth electronic device 522) included in another cluster (e.g., the second cluster 520), by configuring the scanning interval to be scanned by the first electronic device 801 and the scanning interval of the second electronic device 803 to be separated as far as possible in time. According to an embodiment, the first electronic device 801 may configure the scanning interval of the second electronic device 803 so that the second electronic device 803 performs scanning at a time point that is substantially the same as a time point corresponding to a half of the scanning cycle of the first electronic device 801.

The first electronic device 801 may update the first configuration information so that the first configuration information includes information including the start time, execution cycle, and/or duration of the scanning interval for scanning of the second electronic device 803.

Operation 812 of transmitting the signal for requesting the first configuration information and/or operation 813 of transmitting the first configuration information may be omitted. If operation 812 and/or operation 813 are omitted, the first electronic device 801 may assign scanning of the second electronic device 803 and update the first configuration information, in response to reception of the assignment request message transmitted by the second electronic device 803.

In operation 816, the first electronic device 801 may transmit the updated first configuration information to the second electronic device 803.

The second electronic device 803 may perform scanning to search for the second cluster 520, based on information (e.g., the start time for scanning, the execution cycle, and/or the duration of the scanning interval) related to the scanning interval of the second electronic device 803, which is included in the updated first configuration information.

In operation 817, the third electronic device 805 may transmit, to the first electronic device 801, a signal for requesting participation in scanning to search for another cluster.

In operation 818, the first electronic device 801 may transmit the first configuration information to the third electronic device 803 in response to reception of the request signal.

The first configuration information may include the start times, execution cycles, and/or durations of the scanning intervals for scanning of the first electronic device 801 and/or the second electronic device 803.

If the first electronic device 801 broadcasts the first configuration information in operation 813, and the third electronic device 805 has previously received the first configuration information, operation 817 and operation 818 may be omitted.

In operation 819, the third electronic device 805 may transmit, to the first electronic device 801, a message for requesting assignment of scanning.

Requesting assignment may include requesting to assign a start time, a scanning cycle, and/or a duration of a scanning interval for scanning to be performed by the third electronic device 805.

In operation 820, the first electronic device 801 may assign scanning of the third electronic device 805 and may update the first configuration information, based on the assigned scanning of the third electronic device 805.

The first electronic device 801 may receive the assignment request message for scanning, which is transmitted by the third electronic device 805, and may configure the start time for scanning, scanning cycle, and/or duration of the scanning interval for the third electronic device 805.

The first electronic device 801 may perform configuration related to scanning so that the first electronic device 801, the second electronic device 803, and the third electronic device 805 may perform scanning to search for another cluster at different times. The first electronic device 801 may perform configuration so that the scanning interval to be scanned by the first electronic device 801, the scanning interval to be scanned by the second electronic device 803, and the scanning interval to be scanned by the third electronic device 805 are different. For example, if the scanning interval of the first electronic device 801 is configured so that the first electronic device 801 performs scanning between the zeroth discovery window and the first discovery window among the 16 discovery windows, and the scanning interval of the second electronic device 803 is configured so that the second electronic device 803 performs scanning between the eighth discovery window and the ninth discovery window among the 16 discovery windows, the first electronic device 801 may configure the scanning interval of the third electronic device 805 so that the third electronic device 805 performs scanning between a fifth discovery window and a sixth discovery window among the 16 discovery windows.

The first electronic device 801 may perform configuration so that the start time for scanning to be performed by the first electronic device 801, the start time for scanning to be performed by the second electronic device 803, and the start time for scanning to be performed by the third electronic device 805 are different. For example, if the start time for scanning of the first electronic device 801 is configured so that the first electronic device 801 performs scanning between the zeroth discovery window and the first discovery window among the 16 discovery windows, and the start time for scanning of the second electronic device 803 is configured so that the second electronic device 803 performs scanning between the eighth discovery window and the ninth discovery window among the 16 discovery windows, the first electronic device 801 may configure the start time for scanning of the third electronic device 805 so that the third electronic device 805 performs scanning between the fifth discovery window and the sixth discovery window among the 16 discovery windows.

The first electronic device 801 may update the first configuration information so that the first configuration information includes information including the start time, execution cycle, and/or duration of the scanning interval for scanning of the third electronic device 805.

In operation 821, the first electronic device 801 may transmit the updated first configuration information to the third electronic device 805.

The first electronic device 801 may also transmit the updated first configuration information to another electronic device (e.g., the second electronic device 803) participating in scanning. Alternatively, if the first configuration information is updated, the first electronic device 801 may broadcast the updated first configuration information to all electronic devices (e.g., the second electronic device 803 and the third electronic device 805) participating in scanning.

The third electronic device 805 may perform scanning to search for the second cluster 520, based on information (e.g., the start time for scanning, the execution cycle, and/or the duration of the scanning interval) related to the scanning interval of the third electronic device 805, which is included in the updated first configuration information.

Figure 9:
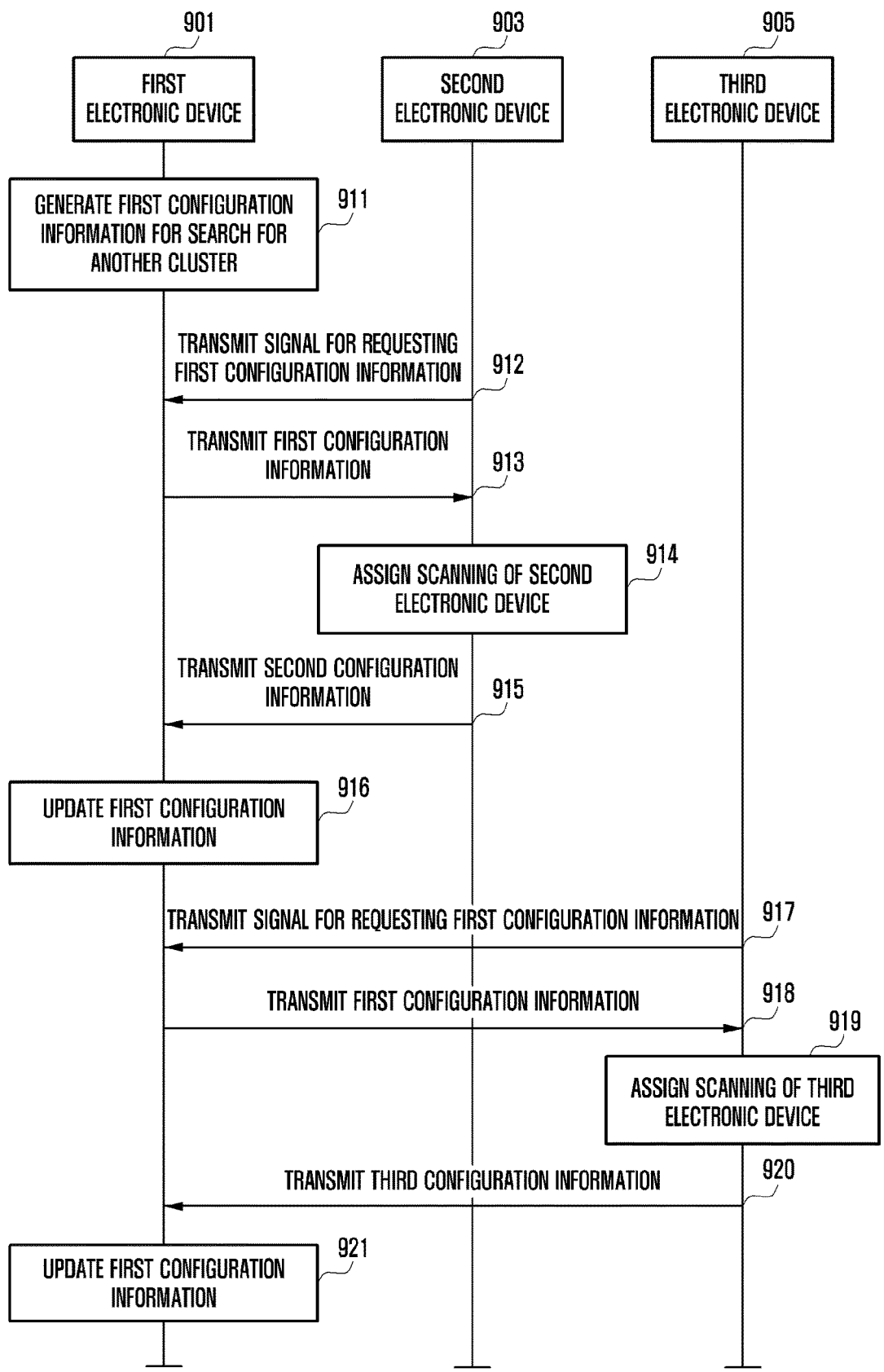
FIG. 9 is a diagram illustrating an example in which a first electronic device, a second electronic device, and/or a third electronic device assign scanning according to various embodiments.

FIG. 9 is a diagram illustrating an example in which a first electronic device, a second electronic device, and/or a third electronic device assign scanning according to various embodiments.

Referring to FIG. 9, a first electronic device 901 (e.g., the electronic device 600 of FIG. 6), a second electronic device 903 (e.g., the second electronic device 512 of FIG. 5A), and/or a third electronic device 905 (e.g., the third electronic device 513 of FIG. 5A) may be included in the same cluster (e.g., the first cluster 510 of FIG. 5A).

In operation 911, the first electronic device 901 may generate (or, create, produce or configure) first configuration information for searching for another cluster (e.g., the second cluster 520 of FIG. 5A).

The first configuration information may include a start time for scanning, an execution cycle of scanning, and/or a duration of a scanning interval for the first electronic device 901.

The start time, execution cycle, and/or interval duration of scanning may be defined in various ways. According to an embodiment, the start time, execution cycle, and/or interval duration of scanning may be expressed in one discovery window (discovery window) unit. For example, the start time for scanning may be expressed so that scanning starts between first discovery window DW0 and second discovery window DW1, and the execution cycle may be expressed so that scanning is performed in every 16 discovery windows. The start time for scanning may be expressed in a bitmap manner.

In operation 912, the second electronic device 903 may transmit, to the first electronic device 901, a signal for requesting the first configuration information.

In operation 913, the first electronic device 901 may transmit the first configuration information to the second electronic device 902 in response to reception of the request signal.

The first configuration information may be transmitted in various schemes. According to an embodiment, the first configuration information may be included in a publish message of a service discovery frame (SDF) defined in NAN so as to be transmitted, but the disclosure is not limited thereto.

In operation 914, the second electronic device 903 may assign scanning of the second electronic device 803, based on the first configuration information.

Assigning of scanning of the second electronic device 903 may include determination of a start time, a scanning cycle, and/or a duration of a scanning interval for scanning to be performed by the second electronic device 903.

The second electronic device 903 may perform configuration related to scanning so that the first electronic device 901 and the second electronic device 903 may perform scanning to search for another cluster at different times. The second electronic device 903 may perform configuration so that the scanning interval to be scanned by the first electronic device 901 and the scanning interval to be scanned by the second electronic device 903 are different. For example, if the scanning interval of the first electronic device 903 is configured so that the first electronic device 901 performs scanning between a zeroth discovery window and a first discovery window among 16 discovery windows, the second electronic device 903 may configure the scanning interval of the second electronic device 903 so that the second electronic device 903 performs scanning between an eighth discovery window and a ninth discovery window among the 16 discovery windows.

The second electronic device 903 may perform configuration so that the start time for scanning to be performed by the first electronic device 901 and the start time for scanning to be performed by the second electronic device 903 are different. For example, if the start time for scanning of the first electronic device 901 is configured so that the first electronic device 901 performs scanning between the zeroth discovery window and the first discovery window among the 16 discovery windows, the second electronic device 903 may configure the start time for scanning of the second electronic device 903 so that the second electronic device 903 performs scanning between the eighth discovery window and the ninth discovery window among the 16 discovery windows.

When performing configuration so that the scanning interval to be scanned by the first electronic device 901 and the scanning interval of the second electronic device 903 are different, the second electronic device 903 may increase a reception probability of signals broadcast by electronic devices (e.g., the fifth electronic device 521 and/or the sixth electronic device 522) included in another cluster (e.g., the second cluster 520), by configuring the scanning interval to be scanned by the first electronic device 901 and the scanning interval of the second electronic device 903 to be separated as far as possible in time. According to an embodiment, the second electronic device 903 may configure the scanning interval of the second electronic device 903 so that the second electronic device 903 performs scanning at a time point that is substantially the same as a time point corresponding to a half of the scanning cycle of the first electronic device 901.

In operation 915, the second electronic device 903 may transmit second configuration information to the first electronic device 901.

The second configuration information may include information (e.g., the start time for scanning, duration of the scanning interval, and scanning cycle for scanning of the second electronic device 903) related to the scanning interval of the second electronic device 903, which is configured by the second electronic device 903.

The second electronic device 903 may perform scanning to search for the second cluster 520, based on the information (e.g., the start time for scanning, the execution cycle, and/or the duration of the scanning interval) related to the scanning interval of the second electronic device 903.

In operation 916, the first electronic device 901 may update the first configuration information, based on the second configuration information.

The first electronic device 901 may update the first configuration information so that the first configuration information includes information including the start time, execution cycle, and/or duration of the scanning interval for scanning of the second electronic device 903.

In operation 917, the third electronic device 905 may transmit, to the first electronic device 901, a signal for requesting the first configuration information.

In operation 918, the first electronic device 901 may transmit the first configuration information to the third electronic device 905 in response to reception of the request signal.

The first configuration information may include the start times, execution cycles, and/or durations of the scanning intervals for scanning of the first electronic device 901 and/or the second electronic device 903.

If the second electronic device 903 broadcasts the second configuration information in operation 915, operation 917 and/or operation 918 may be omitted.

In operation 919, the third electronic device 905 may assign scanning of the third electronic device 905.

Assigning of scanning of the third electronic device 905 may include determination of a start time, a scanning cycle, and/or a duration of a scanning interval for scanning to be performed by the third electronic device 905.

The third electronic device 905 may configure the start time for scanning, scanning cycle, and/or duration of the scanning interval for the third electronic device 905, based on the start times of scanning, scanning cycles, and/or durations of the scanning intervals for the first electronic device 901 and/or the second electronic device 903, which are included in the first configuration information transmitted by the first electronic device 901.

The third electronic device 905 may perform configuration related to scanning so that the first electronic device 901, the second electronic device 903, and the third electronic device 905 may perform scanning to search for another cluster at different times. The third electronic device 905 may perform configuration so that the scanning interval to be scanned by the first electronic device 901, the scanning interval to be scanned by the second electronic device 903, and the scanning interval to be scanned by the third electronic device 905 are different. For example, if the scanning interval of the first electronic device 901 is configured so that scanning is performed between the zeroth discovery window and the first discovery window among the 16 discovery windows, and the scanning interval of the second electronic device 903 is configured so that the second electronic device 903 performs scanning between the eighth discovery window and the ninth discovery window among the 16 discovery windows, the third electronic device 905 may configure the scanning interval of the third electronic device 905 so that the third electronic device 905 performs scanning between a fifth discovery window and a sixth discovery window among the 16 discovery windows.

The third electronic device 905 may perform configuration so that the start time for scanning to be performed by the first electronic device 901, the start time for scanning to be performed by the second electronic device 903, and the start time for scanning to be performed by the third electronic device 905 are different. For example, if the start time for scanning of the first electronic device 901 is configured so that the first electronic device 901 performs scanning between the zeroth discovery window and the first discovery window among the 16 discovery windows, and the start time for scanning of the second electronic device 903 is configured so that the second electronic device 903 performs scanning between the eighth discovery window and the ninth discovery window among the 16 discovery windows, the third electronic device 905 may configure the start time for scanning of the third electronic device 905 so that the third electronic device 905 performs scanning between the fifth discovery window and the sixth discovery window among the 16 discovery windows.

In operation 920, the third electronic device 905 may transmit third configuration information to the first electronic device 901.

The third configuration information may include information (e.g., the start time for scanning, duration of the scanning interval, and scanning cycle for scanning of the third electronic device 905) related to the scanning interval of the third electronic device 905, which is configured by the third electronic device 905.

The third electronic device 905 may perform scanning to search for the second cluster 520, based on the information (e.g., the start time for scanning, the execution cycle, and/or the duration of the scanning interval) related to the scanning interval of the third electronic device 905.

In operation 921, the first electronic device 901 may update the first configuration information, based on the third configuration information.

The first electronic device 901 may update the first configuration information so that the first configuration information includes information including the start time, execution cycle, and/or duration of the scanning interval for scanning of the third electronic device 905.

Figure 10:
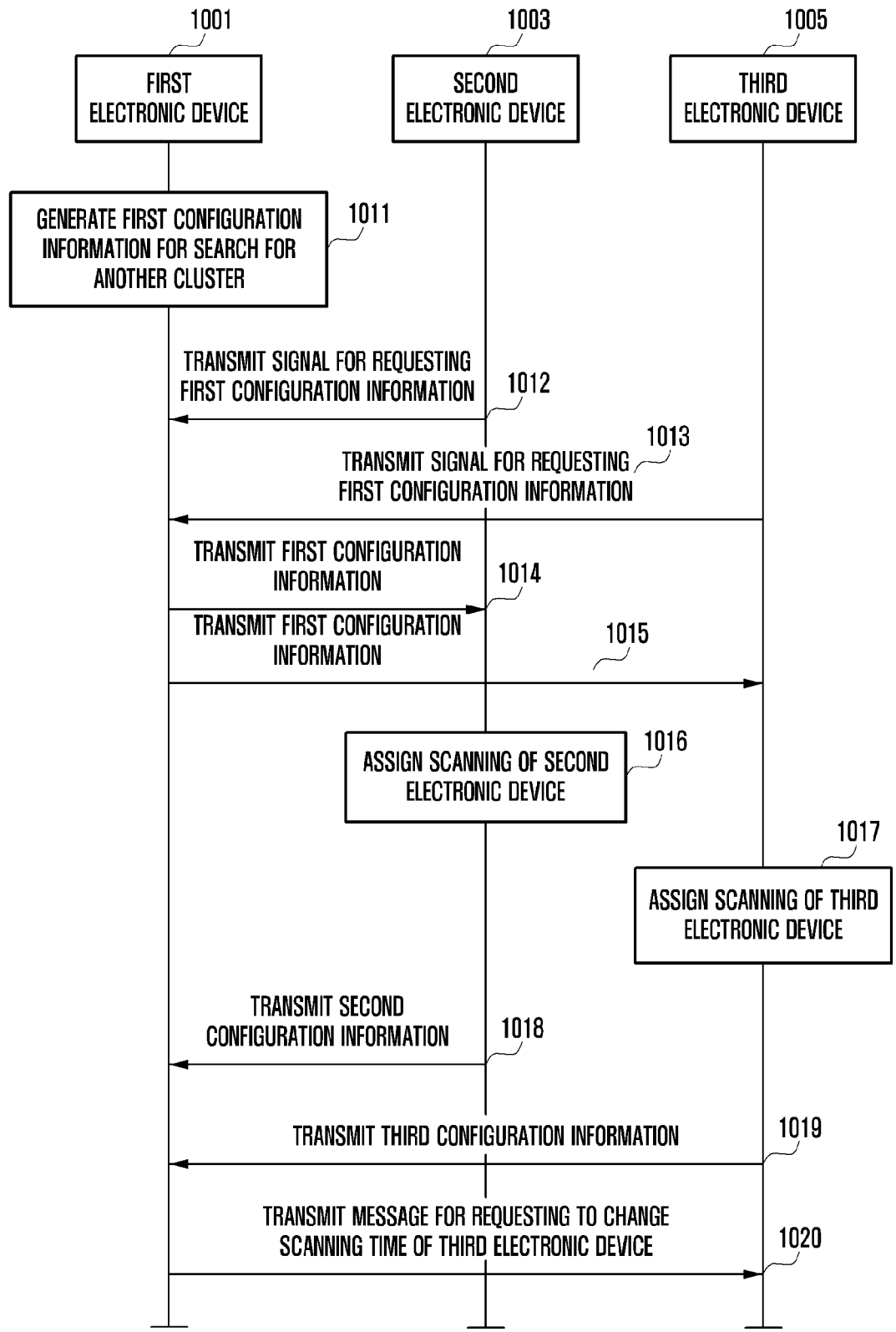
FIG. 10 is a diagram illustrating an example in which a first electronic device changes scanning of a third electronic device according to various embodiments.

FIG. 10 is a diagram illustrating an example in which a first electronic device changes scanning of a third electronic device according to various embodiments.

Referring to FIG. 10, a first electronic device 1001 (e.g., the electronic device 600 of FIG. 6), a second electronic device 1003 (e.g., the second electronic device 512 of FIG. 5A), and/or a third electronic device 1005 (e.g., the third electronic device 513 of FIG. 5A) may be included in the same cluster (e.g., the first cluster 510 of FIG. 5A).

In operation 1011, the first electronic device 1001 may generate (or, create, produce or configure) first configuration information for searching for another cluster (e.g., the second cluster 520 of FIG. 5A).

The first configuration information may be generated at various times. The first electronic device 1001 may be a master device of the first cluster 510, and may generate (or, create, produce or configure) the first configuration information when generating the first cluster 510 or when participating in the first cluster 510. The first electronic device 1001 may be a non-master device of the first cluster 510, and may generate (or, create, produce or configure) the first configuration information when participating in the first cluster 510. The first electronic device 1001 may generate (or, create, produce or configure) the first configuration information in various situations of requesting to search for another cluster 520.

The first configuration information may include a start time for scanning, an execution cycle of scanning, and/or a duration of a scanning interval for the first electronic device 1001.

The start time, execution cycle, and/or interval duration of scanning may be defined in various ways. According to an embodiment, the start time, execution cycle, and/or interval duration of scanning may be expressed in one discovery window (discovery window) unit. For example, the start time for scanning may be expressed so that scanning starts between first discovery window DW0 and second discovery window DW1, and the execution cycle may be expressed so that scanning is performed in every 16 discovery windows. The start time for scanning may be expressed in a bitmap manner.

In operation 1012, the second electronic device 1003 may transmit, to the first electronic device 1001, a signal for requesting the first configuration information.

In operation 1013, the third electronic device 1005 may transmit, to the first electronic device 1001, a signal for requesting the first configuration information.

In operation 1014, the first electronic device 1001 may transmit the first configuration information to the second electronic device 1003 in response to receiving, from the second electronic device 1003, a signal for requesting participation in scanning.

The first configuration information may be transmitted in various schemes. According to an embodiment, the first configuration information may be included in a publish message of a service discovery frame (SDF) defined in NAN so as to be transmitted, but the disclosure is not limited thereto.

In operation 1015, the first electronic device 1001 may transmit the first configuration information to the third electronic device 1005 in response to receiving, from the third electronic device 1005, a signal for requesting participation in scanning.

The first configuration information of operation 1014 and the first configuration information of operation 1015 may be the same.

In operation 1016, the second electronic device 1003 may assign scanning of the second electronic device 1003, based on the first configuration information.

Assigning of scanning of the second electronic device 1003 may include determination of a start time, a scanning cycle, and/or a duration of a scanning interval for scanning to be performed by the second electronic device 1003.

The second electronic device 1003 may perform configuration related to scanning so that the first electronic device 1001 and the second electronic device 1003 may perform scanning to search for another cluster at different times. The second electronic device 1003 may perform configuration so that the scanning interval to be scanned by the first electronic device 1001 and the scanning interval to be scanned by the second electronic device 1003 are different. For example, if the scanning interval of the first electronic device 1001 is configured so that the first electronic device 1001 performs scanning between a zeroth discovery window and a first discovery window among the 16 discovery windows, the second electronic device 1003 may configure the scanning interval of the second electronic device 1003 so that the second electronic device 1003 performs scanning between an eighth discovery window and a ninth discovery window among the 16 discovery windows.

The second electronic device 1003 may perform configuration so that the start time for scanning to be performed by the first electronic device 1001 and the start time for scanning to be performed by the second electronic device 1003 are different. For example, if the start time for scanning of the first electronic device 901 is configured so that the first electronic device 1001 performs scanning between the zeroth discovery window and the first discovery window among the 16 discovery windows, the second electronic device 1003 may configure the start time for scanning of the second electronic device 1003 so that the second electronic device 1003 performs scanning between the eighth discovery window and the ninth discovery window among the 16 discovery windows.

When performing configuration so that the scanning interval to be scanned by the first electronic device 1001 and the scanning interval of the second electronic device 1003 are different, the second electronic device 1003 may increase a reception probability of signals broadcast by electronic devices (e.g., the fifth electronic device 521 and/or the sixth electronic device 522) included in another cluster (e.g., the second cluster 520), by configuring the scanning interval to be scanned by the first electronic device 901 and the scanning interval of the second electronic device 1003 to be separated as far as possible in time. According to an embodiment, the second electronic device 1003 may configure the scanning interval of the second electronic device 1003 so that the second electronic device 1003 performs scanning at a time point that is substantially the same as a time point corresponding to a half of the scanning cycle of the first electronic device 1001.

In operation 1017, the third electronic device 1005 may assign scanning of the third electronic device 1005.

The first configuration information used by the third electronic device 1005 for assigning scanning of the third electronic device 1005 may be the same as the first configuration information used for assigning scanning of the second electronic device 1003. Accordingly, the third electronic device 1005 may assign the same scanning interval as the scanning interval of the second electronic device 1003.

In operation 1018, the second electronic device 1003 may transmit second configuration information to the first electronic device 1001.

The second configuration information may include information (e.g., the start time for scanning, duration of the scanning interval, and scanning cycle for scanning of the second electronic device 903) related to the scanning interval of the second electronic device 903, which is configured by the second electronic device 903.

The second electronic device 1003 may perform scanning to search for the second cluster 520, based on the information (e.g., the start time for scanning, the execution cycle, and/or the duration of the scanning interval) related to the scanning interval of the second electronic device 1003.

The first electronic device 1001 may update the first configuration information, based on the second configuration information.

The first electronic device 1001 may update the first configuration information so that the first configuration information includes information including the start time, execution cycle, and/or duration of the scanning interval for scanning of the second electronic device 1003.

In operation 1019, the third electronic device 1005 may transmit third configuration information to the first electronic device 1001.

The third configuration information may include information (e.g., the start time for scanning, duration of the scanning interval, and scanning cycle for scanning of the third electronic device 1005) related to the scanning interval of the third electronic device 1005, which is configured by the third electronic device 1005.

The first electronic device 1001 may receive the third configuration information, and may identify that the start time for scanning of the third electronic device 1005 is the same as the start time for scanning of the second electronic device 1003 (or the scanning interval of the third electronic device 1005 overlaps the scanning interval of the second electronic device 1003).

In operation 1020, the first electronic device 1001 may transmit, to the third electronic device 1005, a message for requesting to change a scanning time of the third electronic device 1005.

According to an embodiment, the message for requesting to change the scanning time of the third electronic device 1005 may include information including the start times, execution cycles, and/or durations of the scanning intervals for scanning of the first electronic device 1001 and/or the second electronic device 1003.

The third electronic device 1005 may receive the message and reassign scanning of the third electronic device 1005, based on the start times, execution cycles, and/or durations of the scanning intervals for scanning of the first electronic device 1001 and/or the second electronic device 1003, which are included in the message.

The third electronic device 1005 may perform configuration related to scanning so that the first electronic device 1001, the second electronic device 1003, and the third electronic device 1005 may perform scanning to search for another cluster at different times. The third electronic device 1005 may perform configuration so that the scanning interval to be scanned by the first electronic device 1001, the scanning interval to be scanned by the second electronic device 1003, and the scanning interval to be scanned by the third electronic device 1005 are different.

Figure 11:
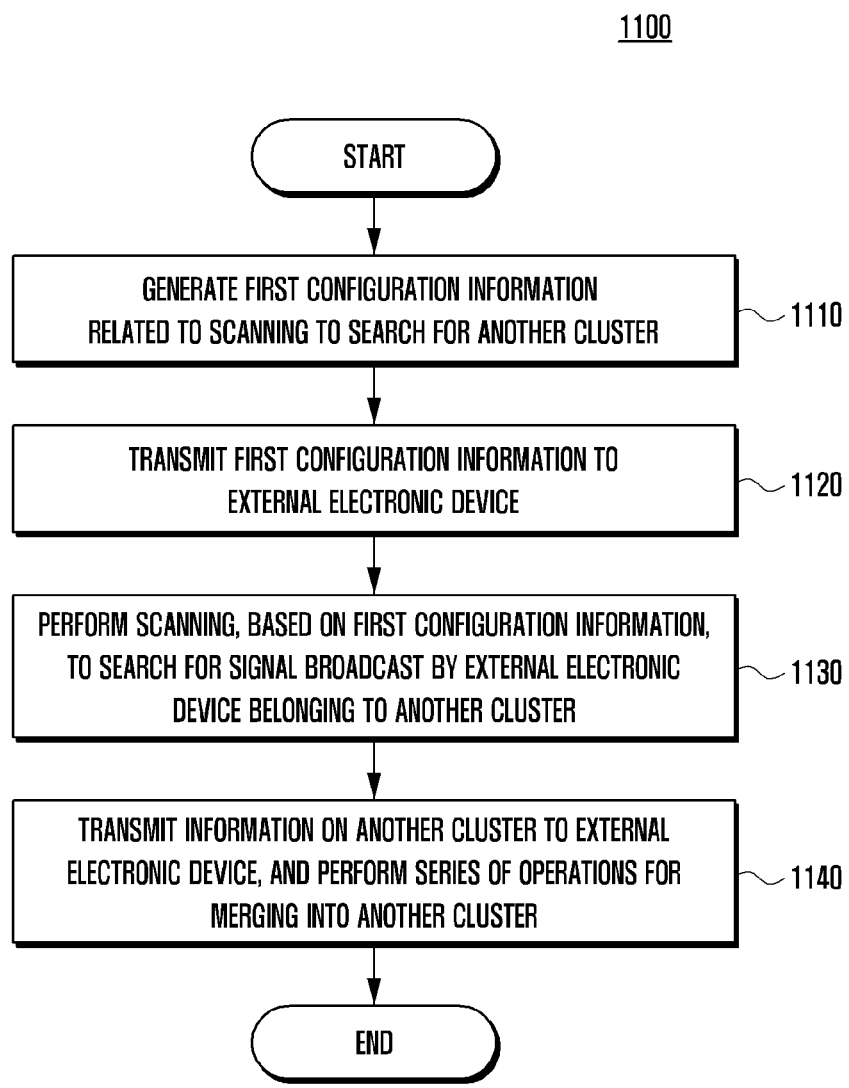
FIG. 11 is a diagram illustrating an example operation method of an electronic device according to various embodiments.

FIG. 11 is a diagram illustrating an example operation method 1100 of an electronic device according to various embodiments.

Referring to FIG. 11, in operation 1110, an electronic device (e.g., the electronic device 600 of FIG. 6 or the first electronic device 511 of FIG. 5A) may generate (or, create, produce or configure) first configuration information related to scanning to search for another cluster (e.g., the second cluster 520 of FIG. 5A).

The processor 600 may search for at least one external electronic device (e.g., the second electronic device 512, the third electronic device 513, and/or the fourth 514 of FIG. 5A) capable of supporting scanning to search for another cluster.

According to an embodiment, the electronic device 600 may control the communication circuit 610 to transmit a signal including identification information of scanning to search for another cluster.

An external electronic device supporting scanning (for convenience of description, it is assumed that the second electronic device 512 supports scanning) from among the external electronic devices (e.g., the second electronic device 512 and/or the third electronic device 513 of FIG. 5A) may transmit a response message corresponding to the signal. The response message may be a signal for requesting participation in scanning to search for the second cluster 520. Upon reception of the response message from the second electronic device 512, when performing configuration related to scanning, the electronic device 600 may perform configuration related to scanning of the second electronic device 512, which includes a start time for scanning to be performed by the second electronic device 512, a duration of a scanning interval, and/or a scanning cycle, and may perform configuration related to scanning of the electronic device 600, which includes a start time for scanning to be performed by the electronic device 600, a duration of a scanning interval, and/or a scanning cycle.

The electronic device 600 may perform configuration related to scanning so that the electronic device 600 and the second electronic device 512 may perform scanning to search for another cluster at different times. The electronic device 600 may perform configuration so that the scanning interval to be scanned by the electronic device 600 and the scanning interval to be scanned by the second electronic device 512 are different. For example, the electronic device 600 may configure the scanning interval of the electronic device 600 so that the electronic device 600 performs scanning between a zeroth discovery window and a first discovery window among 16 discovery windows. The electronic device 600 may configure the scanning interval of the second electronic device 512 so that the second electronic device 512 performs scanning between an eighth discovery window and a ninth discovery window among the 16 discovery windows.

The electronic device 600 may perform configuration so that the start time for scanning to be performed by the electronic device 600 and the start time for scanning to be performed by the second electronic device 512 are different. For example, the electronic device 600 may configure the start time for scanning of the electronic device 600 so that the electronic device 600 performs scanning between the zeroth discovery window and the first discovery window among the 16 discovery windows. The electronic device 600 may configure the start time for scanning of the second electronic device 512 so that the second electronic device 512 performs scanning between the eighth discovery window and the ninth discovery window among the 16 discovery windows.

When performing configuration so that the scanning interval to be scanned by the electronic device 600 and the scanning interval of the second electronic device 512 are different, the electronic device 600 may increase a reception probability of signals broadcast by electronic devices (e.g., the fifth electronic device 521 and/or the sixth electronic device 522) included in another cluster (e.g., the second cluster 520), by configuring the scanning interval to be scanned by the electronic device 600 and the scanning interval of the second electronic device 512 to be separated as far as possible in time. According to an embodiment, the electronic device 600 may configure the scanning interval of the second electronic device 512 so that the second electronic device 512 performs scanning at a time point that is substantially the same as a time point corresponding to a half of the scanning cycle of the electronic device 600.

The electronic device 600 may generate (or, create, produce or configure) first configuration information associated with scanning to search for another cluster for the electronic device 600 and/or the second electronic device 512. The first configuration information may include the start time for scanning, execution cycle of scanning, and/or the duration of the scanning interval for the electronic device 600 and/or the second electronic device 512.

In operation 1120, the electronic device 600 may transmit the first configuration information to an external electronic device (e.g., the second electronic device 512 of FIG. 5A). The electronic device 600 may control the communication circuit 610 to transmit the first configuration information to the second electronic device 512. The first configuration information may be transmitted in various schemes. According to an embodiment, the first configuration information may be included in a publish message of a service discovery frame (SDF) defined in NAN so as to be transmitted, but the disclosure is not limited thereto.

In operation 1130, the electronic device 600 may perform, based on the first configuration information, scanning to search for a signal broadcast by an external electronic device belonging to another cluster 520.

While performing scanning, the electronic device 600 may receive signals (e.g., a sync beacon signal that is a signal for synchronization of the second cluster 520, or a discovery signal that is a signal for discovery of another cluster) broadcast by the electronic devices 521 and 522 of the second cluster 520. The electronic device 600 may identify the presence of the second cluster 520, based on information (e.g., attribute information of the second cluster 520) included in signals transmitted by the fifth electronic device 521 and/or the sixth electronic device 522. The electronic device 600 may receive, from the second electronic device 512, information indicating that the second electronic device 512 has discovered the second cluster 520.

The electronic device 600 may determine whether to merge the first cluster 510 and the second cluster 520. The electronic device 600 may determine whether to merge the first cluster 510 and the second cluster 520, based on attributes of the second cluster 520, which are included in information included in the signals transmitted by the fifth electronic device 522 and/or the sixth electronic device 512, or attributes of the second cluster 520, which are included in information transmitted by the second electronic device 512. For example, the electronic device 600 may compare a cluster grade of the first cluster 510 with a cluster grade of the second cluster 520, which is included in the attributes of the second cluster 520, and may determine to merge the first cluster 510 and the second cluster 520, based on identification that the cluster grade of the second cluster 520 is greater than the cluster grade of the first cluster 510. For another example, the electronic device 600 may compare the cluster grade of the first cluster 510 with the cluster grade of the second cluster 520, which is included in the attributes of the second cluster 520, and may determine not to merge the first cluster 510 and the second cluster 520, based on identification that the cluster grade of the second cluster 520 is not greater than the cluster grade of the first cluster 510.

In operation 1140, the electronic device 600 may transmit the information related to another cluster 520 to the external electronic device 512 and perform a series of operations for merging into the another cluster 520.

The electronic device 600 may transmit a signal (e.g., a beacon signal or a synchronization signal) including information (e.g., attribute information of the second cluster 520) of a cluster (e.g., the second cluster 520) other than the cluster (e.g., the first cluster 510) to which the first electronic device 600 currently belongs, to other electronic devices (e.g., the second electronic device 512, the third electronic device 513, and/or the fourth electronic device 514) included in the first cluster 510 during the discovery window interval of the first cluster 510, based on the determination to merge the first cluster 510 and the second cluster 520. The other electronic devices 512, 513, and 514 may perform merging into (or joining) the second cluster 520, based on the information transmitted by the electronic device 600.

Figure 12:
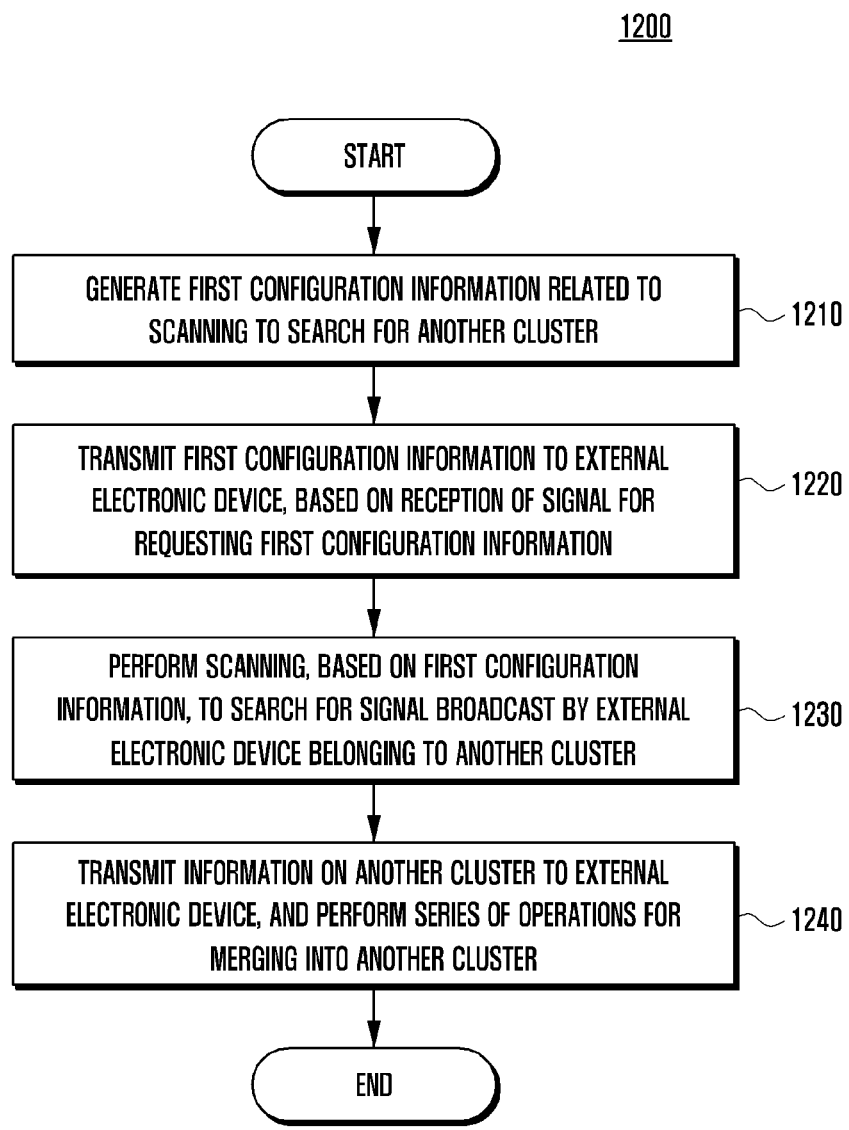
FIG. 12 is a diagram illustrating an example operation method of an electronic device according to various embodiments.

FIG. 12 is a diagram illustrating an example operation method 1200 of an electronic device according to various embodiments of the disclosure.

Referring to FIG. 12, in operation 1210, an electronic device (e.g., the electronic device 600 of FIG. 6 or the first electronic device 511 of FIG. 5A) may generate (or, create, produce or configure) first configuration information related to scanning to search for another cluster (e.g., the second cluster 520 of FIG. 5A).

The first configuration information may be generated at various times. The electronic device 600 may be a master device of the first cluster 510, and may generate (or, create, produce or configure) the first configuration information when generating the first cluster 510 or when participating in the first cluster 510. The electronic device 600 may be a non-master device of the first cluster 510, and may generate (or, create, produce or configure) the first configuration information when participating in the first cluster 510. The electronic device 600 may generate (or, create, produce or configure) the first configuration information in various situations of requesting to search for another cluster 520.

The first configuration information may include a start time for scanning, an execution cycle of scanning, and/or a duration of a scanning interval for the electronic device 600.

The start time, execution cycle, and/or interval duration of scanning may be defined in various ways. According to an embodiment, the start time, execution cycle, and/or interval duration of scanning may be expressed in one discovery window (discovery window) unit. For example, the start time for scanning may be expressed so that scanning starts between first discovery window DW0 and second discovery window DW1, and the execution cycle may be expressed so that scanning is performed in every 16 discovery windows. The start time for scanning may be expressed in a bitmap manner.

An external electronic device (e.g., the second electronic device 512, the third electronic device 513, or the fourth electronic device 514 of FIG. 5A) may transmit a signal for requesting the first configuration information to the electronic device 600.

In operation 1220, the electronic device 600 may transmit the first configuration information to the external electronic device (e.g., the second electronic device 512, the third electronic device 513, or the fourth electronic device 514 of FIG. 5A) in response to reception of the signal for requesting the first configuration information, which is transmitted by the external electronic device (e.g., the second electronic device 512, the third electronic device 513, or the fourth electronic device 514 of FIG. 5A). The first configuration information may be transmitted in various schemes. According to an embodiment, the first configuration information may be included in a publish message of a service discovery frame (SDF) defined in NAN so as to be transmitted, but the disclosure is not limited thereto.

The electronic device 600 may assign scanning of the external electronic device (e.g., the second electronic device 512, the third electronic device 513, or the fourth electronic device 514 of FIG. 5A) and may update the first configuration information, based on the assigned scanning of the external electronic device (e.g., the second electronic device 512, the third electronic device 513, or the fourth electronic device 514 of FIG. 5A).

The electronic device 600 may receive an assignment request message for scanning, which is transmitted by the external electronic device (e.g., the second electronic device 512, the third electronic device 513, or the fourth electronic device 514 of FIG. 5A), and may configure a start time for scanning, a scanning cycle, and/or a duration of a scanning interval for the external electronic device (e.g., the second electronic device 512, the third electronic device 513, or the fourth electronic device 514 of FIG. 5A).

The electronic device 600 may perform configuration related to scanning so that the electronic device 600 and the external electronic device (e.g., the second electronic device 512, the third electronic device 513, or the fourth electronic device 514 of FIG. 5A) may perform scanning to search for another cluster at different times. The electronic device 600 may perform configuration so that the scanning interval to be scanned by the electronic device 600 and the scanning interval to be scanned by the external electronic device (e.g., the second electronic device 512, the third electronic device 513, or the fourth electronic device 514 of FIG. 5A) are different. For example, if the scanning interval of the electronic device 600 is configured so that the electronic device 600 performs scanning between a zeroth discovery window and a first discovery window among 16 discovery windows, the electronic device 600 may configure the scanning interval of the external electronic device (e.g., the second electronic device 512, the third electronic device 513, or the fourth electronic device 514 of FIG. 5A) so that the external electronic device (e.g., the second electronic device 512, the third electronic device 513, or the fourth electronic device 514 of FIG. 5A) performs scanning between an eighth discovery window and a ninth discovery window among the 16 discovery windows.

The electronic device 600 may perform configuration so that the start time for scanning to be performed by the electronic device 600 and the start time for scanning to be performed by the external electronic device (e.g., the second electronic device 512, the third electronic device 513, or the fourth electronic device 514 of FIG. 5A) are different. For example, the electronic device 600 may configure the start time for scanning of the electronic device 600 so that the electronic device 600 performs scanning between the zeroth discovery window and the first discovery window among the 16 discovery windows. The electronic device 600 may configure the start time for scanning of the external electronic device (e.g., the second electronic device 512, the third electronic device 513, or the fourth electronic device 514 of FIG. 5A) so that the external electronic device (e.g., the second electronic device 512, the third electronic device 513, or the fourth electronic device 514 of FIG. 5A) performs scanning between the eighth discovery window and the ninth discovery window among the 16 discovery windows.

When performing configuration so that the scanning interval to be scanned by the electronic device 600 and the scanning interval of the external electronic device (e.g., the second electronic device 512, the third electronic device 513, or the fourth electronic device 514 of FIG. 5A) are different, the electronic device 600 may increase a reception probability of signals broadcast by electronic devices (e.g., the fifth electronic device 521 and/or the sixth electronic device 522) included in another cluster (e.g., the second cluster 520), by configuring the scanning interval to be scanned by the electronic device 600 and the scanning interval of the external electronic device (e.g., the second electronic device 512, the third electronic device 513, or the fourth electronic device 514 of FIG. 5A) to be separated as far as possible in time. According to an embodiment, the electronic device 600 may configure the scanning interval of the external electronic device (e.g., the second electronic device 512, the third electronic device 513, or the fourth electronic device 514 of FIG. 5A) so that the external electronic device (e.g., the second electronic device 512, the third electronic device 513, or the fourth electronic device 514 of FIG. 5A) performs scanning at a time point that is substantially the same as a time point corresponding to a half of the scanning cycle of the electronic device 600.

The electronic device 600 may update the first configuration information so that the first configuration information includes information including the start time, execution cycle, and/or duration of the scanning interval for scanning of the external electronic device (e.g., the second electronic device 512, the third electronic device 513, or the fourth electronic device 514 of FIG. 5A).

In the above description, it is described that the electronic device 600 assigns scanning, but not only the electronic device 600 but also the external electronic device (e.g., the second electronic device 512, the third electronic device 513, or the fourth electronic device 514 of FIG. 5A) may assign scanning, based on the first configuration information.

The external electronic device (e.g., the second electronic device 512, the third electronic device 513, or the fourth electronic device 514 of FIG. 5A) may assign scanning of the external electronic device (e.g., the second electronic device 512, the third electronic device 513, or the fourth electronic device 514 of FIG. 5A), based on the first configuration information.

Assigning of scanning of the external electronic device (e.g., the second electronic device 512, the third electronic device 513, or the fourth electronic device 514 of FIG. 5A) may include determination of the start time, scanning cycle, and/or duration of the scanning interval for scanning to be performed by the external electronic device (e.g., the second electronic device 512, the third electronic device 513, or the fourth electronic device 514 of FIG. 5A).

The external electronic device (e.g., the second electronic device 512, the third electronic device 513, or the fourth electronic device 514 of FIG. 5A) may perform configuration related to scanning so that the electronic device 600 and the external electronic device (e.g., the second electronic device 512, the third electronic device 513, or the fourth electronic device 514 of FIG. 5A) may perform scanning to search for another cluster at different times. The external electronic device (e.g., the second electronic device 512, the third electronic device 513, or the fourth electronic device 514 of FIG. 5A) may perform configuration so that the scanning interval to be scanned by the electronic device 600 and the scanning interval to be scanned by the external electronic device (e.g., the second electronic device 512, the third electronic device 513, or the fourth electronic device 514 of FIG. 5A) are different. For example, if the scanning interval of the electronic device 600 is configured so that the electronic device 600 performs scanning between the zeroth discovery window and the first discovery window among the 16 discovery windows, the external electronic device (e.g., the second electronic device 512, the third electronic device 513, or the fourth electronic device 514 of FIG. 5A) may configure the scanning interval of the external electronic device (e.g., the second electronic device 512, the third electronic device 513, or the fourth electronic device 514 of FIG. 5A) so that the external electronic device (e.g., the second electronic device 512, the third electronic device 513, or the fourth electronic device 514 of FIG. 5A) performs scanning between the eighth discovery window and the ninth discovery window among the 16 discovery windows.

The external electronic device (e.g., the second electronic device 512, the third electronic device 513, or the fourth electronic device 514 of FIG. 5A) may perform configuration so that the start time for scanning to be performed by the electronic device 600 and the start time for scanning to be performed by the external electronic device (e.g., the second electronic device 512, the third electronic device 513, or the fourth electronic device 514 of FIG. 5A) are different. For example, if the start time for scanning of the electronic device 600 is configured so that the electronic device 600 performs scanning between the zeroth discovery window and the first discovery window among the 16 discovery windows, the second electronic device 901 may configure the start time for scanning of the external electronic device (e.g., the second electronic device 512, the third electronic device 513, or the fourth electronic device 514 of FIG. 5A) so that the external electronic device (e.g., the second electronic device 512, the third electronic device 513, or the fourth electronic device 514 of FIG. 5A) performs scanning between the eighth discovery window and the ninth discovery window among the 16 discovery windows.

When performing configuration so that the scanning interval to be scanned by the electronic device 600 and the scanning interval of the external electronic device (e.g., the second electronic device 512, the third electronic device 513, or the fourth electronic device 514 of FIG. 5A) are different, the external electronic device (e.g., the second electronic device 512, the third electronic device 513, or the fourth electronic device 514 of FIG. 5A) may increase a reception probability of signals broadcast by electronic devices (e.g., the fifth electronic device 521 and/or the sixth electronic device 522) included in another cluster (e.g., the second cluster 520), by configuring the scanning interval to be scanned by the electronic device 600 and the scanning interval of the external electronic device (e.g., the second electronic device 512, the third electronic device 513, or the fourth electronic device 514 of FIG. 5A) to be separated as far as possible in time. According to an embodiment, the external electronic device (e.g., the second electronic device 512, the third electronic device 513, or the fourth electronic device 514 of FIG. 5A) may configure the scanning interval of the external electronic device (e.g., the second electronic device 512, the third electronic device 513, or the fourth electronic device 514 of FIG. 5A) so that the external electronic device (e.g., the second electronic device 512, the third electronic device 513, or the fourth electronic device 514 of FIG. 5A) performs scanning at a time point that is substantially the same as a time point corresponding to a half of the scanning cycle of the electronic device 600.

The external electronic device (e.g., the second electronic device 512, the third electronic device 513, or the fourth electronic device 514 of FIG. 5A) may transmit second configuration information to the electronic device 600.

The second configuration information may include information (e.g., the start time for scanning, the duration of the scanning interval, and the scanning cycle of the external electronic device (e.g., the second electronic device 512, the third electronic device 513, or the fourth electronic device 514 of FIG. 5A)) related to the scanning interval of the external electronic device (e.g., the second electronic device 512, the third electronic device 513, or the fourth electronic device 514 of FIG. 5A), which is configured by the external electronic device (e.g., the second electronic device 512, the third electronic device 513, or the fourth electronic device 514 of FIG. 5A).

The external electronic device (e.g., the second electronic device 512, the third electronic device 513, or the fourth electronic device 514 of FIG. 5A) may perform scanning to search for the second cluster 520, based on information (e.g., the start time, execution cycle, and/or duration of the scanning interval for scanning) related to the scanning interval of the external electronic device (e.g., the second electronic device 512, the third electronic device 513, or the fourth electronic device 514 of FIG. 5A).

The electronic device 600 may update the first configuration information, based on the second configuration information.

In operation 1230, the electronic device 600 may perform, based on the first configuration information, scanning to search for a signal broadcast by an external electronic device belonging to another cluster 520.

While performing scanning, the electronic device 600 may receive signals (e.g., a sync beacon signal that is a signal for synchronization of the second cluster 520, or a discovery signal that is a signal for discovery of another cluster) broadcast by the electronic devices 521 and 522 of the second cluster 520. The electronic device 600 may identify the presence of the second cluster 520, based on information (e.g., attribute information of the second cluster 520) included in signals transmitted by the fifth electronic device 521 and/or the sixth electronic device 522. The electronic device 600 may receive, from the second electronic device 512, information indicating that the second electronic device 512 has discovered the second cluster 520.

The electronic device 600 may determine whether to merge the first cluster 510 and the second cluster 520. The electronic device 600 may determine whether to merge the first cluster 510 and the second cluster 520, based on attributes of the second cluster 520, which are included in information included in the signals transmitted by the fifth electronic device 522 and/or the sixth electronic device 512, or attributes of the second cluster 520, which are included in information transmitted by the second electronic device 512. For example, the electronic device 600 may compare a cluster grade of the first cluster 510 with a cluster grade of the second cluster 520, which is included in the attributes of the second cluster 520, and may determine to merge the first cluster 510 and the second cluster 520, based on identification that the cluster grade of the second cluster 520 is greater than the cluster grade of the first cluster 510. For another example, the electronic device 600 may compare the cluster grade of the first cluster 510 with the cluster grade of the second cluster 520, which is included in the attributes of the second cluster 520, and may determine not to merge the first cluster 510 and the second cluster 520, based on identification that the cluster grade of the second cluster 520 is not greater than the cluster grade of the first cluster 510.

In operation 1240, the electronic device 600 may transmit the information related to another cluster 520 to the external electronic device 512 and perform a series of operations for merging into the another cluster 520.

The electronic device 600 may transmit a signal (e.g., a beacon signal or a synchronization signal) including information (e.g., attribute information of the second cluster 520) of a cluster (e.g., the second cluster 520) other than the cluster (e.g., the first cluster 510) to which the first electronic device 600 currently belongs, to other electronic devices (e.g., the second electronic device 512, the third electronic device 513, and/or the fourth electronic device 514) included in the first cluster 510 during the discovery window interval of the first cluster 510, based on the determination to merge the first cluster 510 and the second cluster 520. The other electronic devices 512, 513, and 514 may perform merging into (or joining) the second cluster 520, based on the information transmitted by the electronic device 600.

Figure 13:
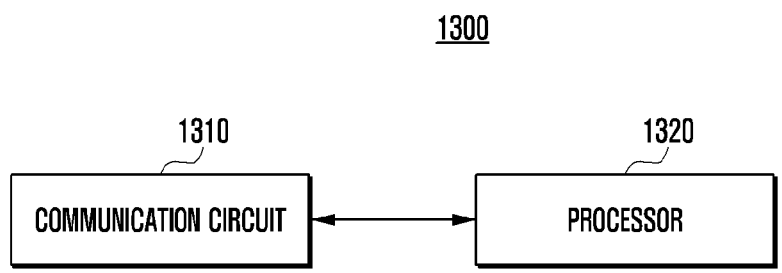
FIG. 13 is a diagram illustrating an example electronic device according to various embodiments.

FIG. 13 is a diagram illustrating an example electronic device according to various embodiments.

According to various embodiments of the disclosure, an electronic device 1300 (e.g., the second electronic device 803 of FIG. 8, the second electronic device 903 of FIG. 9, and the second electronic device 1003 of FIG. 10) may include a communication circuit 1310 (e.g., the wireless communication module 192 of FIG. 1) and a processor 1320 (e.g., the processor 120 of FIG. 1).

The communication circuit 1310 may include various circuit structures used for modulation and/or demodulation of a signal in the electronic device 1300. For example, the communication circuit 1310 may modulate a baseband signal into a radio frequency (RF) band signal so as to output the same through an antenna (not illustrated), or may demodulate an RF band signal received through the antenna into a baseband signal so as to transmit the same to the processor 1320.

The communication circuit 1310 may transmit or receive various data to or from an external electronic device (e.g., the second electronic device 512, the third electronic device 513, and/or the fourth electronic device 514 of FIG. 5A) through a frequency band (e.g., 2.4 GHz, 5 GHz, and/or 6 GHz) used by electronic devices of a NAN cluster (e.g., the first cluster 510 of FIG. 5A).

The processor 1320 (including, e.g., processing circuitry) may receive data transmitted by an application processor (e.g., the processor 120 of FIG. 1) and generate a packet for transmission of the received data to an external electronic device (e.g., the second electronic device 512, the third electronic device 513, and/or the fourth electronic device 514 of FIG. 5A). The processor 1320 may be defined to be a communication processor included in a communication module (e.g., the wireless communication module 192 of FIG. 1). According to an embodiment, the processor 1320 may generate (or, create, produce or configure) a packet by performing channel coding based on data transmitted by an application processor (e.g., the application processor 120 of FIG. 1), may identify whether at least part of data transmitted by the external electronic device 410 has an error, or may perform error recovery (e.g., hybrid auto repeat request (HARQ)) if an error occurs.

Based on NAN cluster information included in a signal broadcast by the external electronic device 512, 513, or 514 included in a cluster (or network) (e.g., the first cluster 510 of FIG. 5A) implemented in a neighbor awareness networking (NAN) scheme, the processor 1320 may perform synchronization with the NAN cluster. Alternatively, the processor 1320 may receive NAN cluster information via a communication scheme (e.g., short-range wireless communication including Bluetooth or Wi-Fi) other than a NAN-based communication scheme. For example, the processor 1320 may transmit a probe request signal for discovering an external electronic device (e.g., the second electronic device 512, the third electronic device 513, and/or the fourth 514 in FIG. 5A) to be connected via Wi-Fi, and may perform NAN cluster synchronization based on NAN cluster information included in a probe response message transmitted by the external electronic device (e.g., the second electronic device 512, the third electronic device 513, and/or the fourth 514 in FIG. 5A) in response to the probe request signal.

The NAN cluster synchronization may include receiving time clock information of an electronic device (or a master device of the NAN cluster) (e.g., the first electronic device 410 of FIG. 4) representing the NAN cluster so that electronic devices included in the NAN cluster transmit and/or receive data on the same channel and/or during the same time. For example, the processor 1320 may receive a beacon broadcast by the external electronic device (e.g., the second electronic device 512, the third electronic device 513, and/or the fourth 514 in FIG. 5A) and may perform NAN cluster synchronization based on time clock information of the external electronic device (e.g., the second electronic device 512, the third electronic device 513, and/or the fourth 514 in FIG. 5A), which is included in the beacon.

After the NAN cluster synchronization is completed, the processor 1320 may activate the communication circuit 1310 in each designated interval (e.g., a size of a discovery window with an interval having a first value) and may receive data transmitted by the external electronic devices (e.g., the second electronic device 512, the third electronic device 513, and/or the fourth 514 in FIG. 5A) included in the first cluster 510 in each designated interval or may transmit data to the external electronic devices (e.g., the second electronic device 512, the third electronic device 513, and/or the fourth 514 in FIG. 5A).

After participating in the NAN cluster, the processor 1320 may participate in scanning to search for the second cluster 520 due to various reasons. The processor 1320 may participate in scanning to search for the second cluster 520, based on the electronic device 1300 being configured to perform scanning to search for the second cluster 520. Alternatively, the processor 1320 may participate in scanning to search for the second cluster 520, based on identification that the signal broadcast by the first electronic device (e.g., the electronic device 600 of FIG. 6, the first electronic device 801 of FIG. 8, the first electronic device 901 of FIG. 9, or the first electronic device 1001 of FIG. 10) includes identification information of scanning to search for another cluster 520.

As part of an operation to participate in scanning to search for the second cluster 520, the processor 1320 may transmit, to the first electronic device (e.g., the electronic device 600 of FIG. 6, the first electronic device 801 of FIG. 8, the first electronic device 901 of FIG. 9, or the first electronic device 1001 of FIG. 10), a response message corresponding to the signal including the identification information of scanning to search for another cluster 520.

The response message may be a signal for requesting first configuration information related to scanning to search for another cluster. Alternatively, the response message may be a signal for requesting participation in scanning to search for the second cluster 520. Alternatively, the response message may be a signal for accepting participation in scanning to search for the second cluster 520, in response to the electronic device 600 transmitting the signal for requesting participation in scanning to search for the second cluster 520.

When the response message is received, the first electronic device (e.g., the electronic device 600 of FIG. 6, the first electronic device 801 of FIG. 8, the first electronic device 901 of FIG. 9, or the first electronic device 1001 of FIG. 10) may transmit the first configuration information.

The first configuration information may include a start time for scanning, an execution cycle of scanning, and/or a duration of a scanning interval for the first electronic device (e.g., the electronic device 600 of FIG. 6, the first electronic device 801 of FIG. 8, the first electronic device 901 of FIG. 9, or the first electronic device 1001 of FIG. 10).

The start time, execution cycle, and/or interval duration of scanning may be defined in various ways. According to an embodiment, the start time, execution cycle, and/or interval duration of scanning may be expressed in one discovery window (discovery window) unit. For example, the start time for scanning may be expressed so that scanning starts between first discovery window DW0 and second discovery window DW1, and the execution cycle may be expressed so that scanning is performed in every 16 discovery windows. The start time for scanning may be expressed in a bitmap manner.

The first configuration information may be transmitted in various schemes. According to an embodiment, the first configuration information may be included in a publish message of a service discovery frame (SDF) defined in NAN so as to be transmitted, but the disclosure is not limited thereto.

Based on the first configuration information, the processor 1320 may identify information related to scanning performed by the first electronic device (e.g., the electronic device 600 of FIG. 6, the first electronic device 801 of FIG. 8, the first electronic device 901 of FIG. 9, or the first electronic device 1001 of FIG. 10).

The processor 1320 may assign scanning of the electronic device 1300, based on the first configuration information.

Assigning of scanning of the electronic device 1300 may include determination of a start time, a scanning cycle, and/or a duration of a scanning interval for scanning to be performed by the electronic device 1300.

The processor 1320 may perform configuration related to scanning so that the first electronic device (e.g., the electronic device 600 of FIG. 6, the first electronic device 801 of FIG. 8, the first electronic device 901 of FIG. 9, or the first electronic device 1001 of FIG. 10) and the electronic device 1300 may perform scanning to search for another cluster at different times. The processor 1320 may perform configuration so that the scanning interval to be scanned by the first electronic device (e.g., the electronic device 600 of FIG. 6, the first electronic device 801 of FIG. 8, the first electronic device 901 of FIG. 9, or the first electronic device 1001 of FIG. 10) and the scanning interval of the second electronic device 903 are different. For example, if the scanning interval of the first electronic device (e.g., the electronic device 600 of FIG. 6, the first electronic device 801 of FIG. 8, the first electronic device 901 of FIG. 9, or the first electronic device 1001 of FIG. 10) is configured so that the first electronic device (e.g., the electronic device 600 of FIG. 6, the first electronic device 801 of FIG. 8, the first electronic device 901 of FIG. 9, or the first electronic device 1001 of FIG. 10) performs scanning between a zeroth discovery window and a first discovery window among 16 discovery windows, the processor 1320 may configure the scanning interval of the electronic device 1300 so that the electronic device 1300 performs scanning between an eighth discovery window and a ninth discovery window among the 16 discovery windows.

The processor 1320 may perform configuration so that the start time for scanning to be performed by the first electronic device (e.g., the electronic device 600 of FIG. 6, the first electronic device 801 of FIG. 8, the first electronic device 901 of FIG. 9, or the first electronic device 1001 of FIG. 10) and the start time for scanning to be performed by the electronic device 1300 are different. For example, if the start time for scanning of the first electronic device (e.g., the electronic device 600 of FIG. 6, the first electronic device 801 of FIG. 8, the first electronic device 901 of FIG. 9, or the first electronic device 1001 of FIG. 10) is configured so that the first electronic device (e.g., the electronic device 600 of FIG. 6, the first electronic device 801 of FIG. 8, the first electronic device 901 of FIG. 9, or the first electronic device 1001 of FIG. 10) performs scanning between the zeroth discovery window and the first discovery window among the 16 discovery windows, the processor 1320 may configure the start time for scanning of the electronic device 1300 so that the electronic device 1300 performs scanning between the eighth discovery window and the ninth discovery window among the 16 discovery windows.

When performing configuration so that the scanning interval to be scanned by the first electronic device (e.g., the electronic device 600 of FIG. 6, the first electronic device 801 of FIG. 8, the first electronic device 901 of FIG. 9, or the first electronic device 1001 of FIG. 10) and the scanning interval of the second electronic device 903 are different, the processor 1320 may increase a reception probability of signals broadcast by electronic devices (e.g., the fifth electronic device 521 and/or the sixth electronic device 522) included in another cluster (e.g., the second cluster 520), by configuring the scanning interval to be scanned by the first electronic device (e.g., the electronic device 600 of FIG. 6, the first electronic device 801 of FIG. 8, the first electronic device 901 of FIG. 9, or the first electronic device 1001 of FIG. 10) and the scanning interval of the electronic device 1300 to be separated as far as possible in time. According to an embodiment, the processor 1320 may configure the scanning interval of the electronic device 1300 so that the electronic device 1300 performs scanning at a time point that is substantially the same as a time point corresponding to a half of the scanning cycle of the first electronic device (e.g., the electronic device 600 of FIG. 6, the first electronic device 801 of FIG. 8, the first electronic device 901 of FIG. 9, or the first electronic device 1001 of FIG. 10).

After receiving the first configuration information, the processor 1320 may transmit, to the first electronic device (e.g., the electronic device 600 of FIG. 6, the first electronic device 801 of FIG. 8, the first electronic device 901 of FIG. 9, or the first electronic device 1001 of FIG. 10), an assignment request message for requesting to assign scanning of the electronic device 1300.

Requesting assignment may include requesting to assign a start time, a scanning cycle, and/or a duration of a scanning interval for scanning to be performed by the second electronic device 803.

The first electronic device (e.g., the electronic device 600 of FIG. 6, the first electronic device 801 of FIG. 8, the first electronic device 901 of FIG. 9, or the first electronic device 1001 of FIG. 10) may assign scanning of the electronic device 1300 and may update the first configuration information, based on the assigned scanning of the electronic device 1300.

The first electronic device (e.g., the electronic device 600 of FIG. 6, the first electronic device 801 of FIG. 8, the first electronic device 901 of FIG. 9, or the first electronic device 1001 of FIG. 10) may receive the assignment request message for scanning, which is transmitted by the electronic device 1300, and may configure the start time for scanning, scanning cycle, and/or duration of the scanning interval for the electronic device 1300.

The first electronic device (e.g., the electronic device 600 of FIG. 6, the first electronic device 801 of FIG. 8, the first electronic device 901 of FIG. 9, or the first electronic device 1001 of FIG. 10) may perform configuration related to scanning so that the first electronic device (e.g., the electronic device 600 of FIG. 6, the first electronic device 801 of FIG. 8, the first electronic device 901 of FIG. 9, or the first electronic device 1001 of FIG. 10) and the electronic device 1300 may perform scanning to search for another cluster at different times. The first electronic device (e.g., the electronic device 600 of FIG. 6, the first electronic device 801 of FIG. 8, the first electronic device 901 of FIG. 9, or the first electronic device 1001 of FIG. 10) may perform configuration so that the scanning interval to be scanned by the first electronic device (e.g., the electronic device 600 of FIG. 6, the first electronic device 801 of FIG. 8, the first electronic device 901 of FIG. 9, or the first electronic device 1001 of FIG. 10) and the scanning interval of the electronic device 1300 are different. For example, if the scanning interval of the first electronic device (e.g., the electronic device 600 of FIG. 6, the first electronic device 801 of FIG. 8, the first electronic device 901 of FIG. 9, or the first electronic device 1001 of FIG. 10) is configured so that the first electronic device (e.g., the electronic device 600 of FIG. 6, the first electronic device 801 of FIG. 8, the first electronic device 901 of FIG. 9, or the first electronic device 1001 of FIG. 10) performs scanning between the zeroth discovery window and the first discovery window among the 16 discovery windows, the first electronic device (e.g., the electronic device 600 of FIG. 6, the first electronic device 801 of FIG. 8, the first electronic device 901 of FIG. 9, or the first electronic device 1001 of FIG. 10) may configure the scanning interval of the electronic device 1300 so that the electronic device 1300 performs scanning between the eighth discovery window and the ninth discovery window among the 16 discovery windows.

The first electronic device (e.g., the electronic device 600 of FIG. 6, the first electronic device 801 of FIG. 8, the first electronic device 901 of FIG. 9, or the first electronic device 1001 of FIG. 10) may perform configuration so that the start time for scanning to be performed by the first electronic device (e.g., the electronic device 600 of FIG. 6, the first electronic device 801 of FIG. 8, the first electronic device 901 of FIG. 9, or the first electronic device 1001 of FIG. 10) and the start time for scanning to be performed by the electronic device 1300 are different. For example, the first electronic device (e.g., the electronic device 600 of FIG. 6, the first electronic device 801 of FIG. 8, the first electronic device 901 of FIG. 9, or the first electronic device 1001 of FIG. 10) may configure the start time for scanning of the first electronic device (e.g., the electronic device 600 of FIG. 6, the first electronic device 801 of FIG. 8, the first electronic device 901 of FIG. 9, or the first electronic device 1001 of FIG. 10) so that the first electronic device (e.g., the electronic device 600 of FIG. 6, the first electronic device 801 of FIG. 8, the first electronic device 901 of FIG. 9, or the first electronic device 1001 of FIG. 10) performs scanning between the zeroth discovery window and the first discovery window among the 16 discovery windows. The first electronic device (e.g., the electronic device 600 of FIG. 6, the first electronic device 801 of FIG. 8, the first electronic device 901 of FIG. 9, or the first electronic device 1001 of FIG. 10) may configure the start time for scanning of the electronic device 1300 so that the electronic device 1300 performs scanning between the eighth discovery window and the ninth discovery window among the 16 discovery windows.

When performing configuration so that the scanning interval to be scanned by the first electronic device (e.g., the electronic device 600 of FIG. 6, the first electronic device 801 of FIG. 8, the first electronic device 901 of FIG. 9, or the first electronic device 1001 of FIG. 10) and the scanning interval of the electronic device 1300 are different, the first electronic device (e.g., the electronic device 600 of FIG. 6, the first electronic device 801 of FIG. 8, the first electronic device 901 of FIG. 9, or the first electronic device 1001 of FIG. 10) may increase a reception probability of signals broadcast by electronic devices (e.g., the fifth electronic device 521 and/or the sixth electronic device 522) included in another cluster (e.g., the second cluster 520), by configuring the scanning interval to be scanned by the first electronic device (e.g., the electronic device 600 of FIG. 6, the first electronic device 801 of FIG. 8, the first electronic device 901 of FIG. 9, or the first electronic device 1001 of FIG. 10) and the scanning interval of the electronic device 1300 to be separated as far as possible in time. According to an embodiment, the first electronic device (e.g., the electronic device 600 of FIG. 6, the first electronic device 801 of FIG. 8, the first electronic device 901 of FIG. 9, or the first electronic device 1001 of FIG. 10) may configure the scanning interval of the electronic device 1300 so that the electronic device 1300 performs scanning at a time point that is substantially the same as a time point corresponding to a half of the scanning cycle of the first electronic device (e.g., the electronic device 600 of FIG. 6, the first electronic device 801 of FIG. 8, the first electronic device 901 of FIG. 9, or the first electronic device 1001 of FIG. 10).

The first electronic device (e.g., the electronic device 600 of FIG. 6, the first electronic device 801 of FIG. 8, the first electronic device 901 of FIG. 9, or the first electronic device 1001 of FIG. 10) may update the first configuration information so that the first configuration information includes information including the start time, execution cycle, and/or duration of the scanning interval for scanning of the electronic device 1300.

The first electronic device (e.g., the electronic device 600 of FIG. 6, the first electronic device 801 of FIG. 8, the first electronic device 901 of FIG. 9, or the first electronic device 1001 of FIG. 10) may transmit the updated first configuration information to the electronic device 1300.

The processor 1320 may perform scanning to search for the second cluster 520, based on information (e.g., the start time for scanning, the execution cycle, and/or the duration of the scanning interval) related to the scanning interval of the electronic device 1300, which is included in the updated first configuration information.

The processor 1320 may control the communication circuit 1310 so that scanning to search for the second cluster 520 is performed based on the first configuration information. The processor 1320 may control the communication circuit 1310 to receive signals broadcast by electronic devices (e.g., the fifth electronic device 521 and/or the sixth electronic device 522 of FIG. 5A) included in the second cluster 520, based on the first configuration information.

While performing scanning, the processor 1320 may receive, via the communication circuit 1310, signals (e.g., a sync beacon signal that is a signal for synchronization of the second cluster 520, or a discovery signal that is a signal for discovery of another cluster) broadcast by the electronic devices 521 and 522 of the second cluster 520. The electronic device 600 may identify the presence of the second cluster 520, based on information (e.g., attribute information of the second cluster 520) included in signals transmitted by the fifth electronic device 521 and/or the sixth electronic device 522. The processor 1320 may receive information indicating that the second electronic device 512 has discovered the second cluster 520, from the second electronic device 512 via the communication circuit 1310.

The processor 1320 may determine whether to merge the first cluster 510 and the second cluster 520. The processor 1320 may determine whether to merge the first cluster 510 and the second cluster 520, based on attributes of the second cluster 520, which are included in information included in the signals transmitted by the fifth electronic device 522 and/or the sixth electronic device 512, or attributes of the second cluster 520, which are included in information transmitted by the first electronic device (e.g., the electronic device 600 of FIG. 6, the first electronic device 801 of FIG. 8, the first electronic device 901 of FIG. 9, or the first electronic device 1001 of FIG. 10). For example, the processor 1320 may compare a cluster grade of the first cluster 510 with a cluster grade of the second cluster 520, which is included in the attributes of the second cluster 520, and may determine to merge the first cluster 510 and the second cluster 520, based on identification that the cluster grade of the second cluster 520 is greater than the cluster grade of the first cluster 510. For another example, the processor 1320 may compare the cluster grade of the first cluster 510 with the cluster grade of the second cluster 520, which is included in the attributes of the second cluster 520, and may determine not to merge the first cluster 510 and the second cluster 520, based on identification that the cluster grade of the second cluster 520 is not greater than the cluster grade of the first cluster 510.

The processor 1320 may transmit a signal (e.g., a beacon signal or a synchronization signal) including information (e.g., attribute information of the second cluster 520) of a cluster (e.g., the second cluster 520) other than the cluster (e.g., the first cluster 510) to which the electronic device 1300 currently belongs, to other electronic devices (e.g., the first electronic device (e.g., the electronic device 600 of FIG. 6, the first electronic device 801 of FIG. 8, the first electronic device 901 of FIG. 9, or the first electronic device 1001 of FIG. 10), the third electronic device 513, and/or the fourth electronic device 514) included in the first cluster 510 during the discovery window interval of the first cluster 510, based on the determination to merge the first cluster 510 and the second cluster 520. The other electronic devices 511, 513, and 514 may perform merging into (or joining) the second cluster 520, based on the information transmitted by the electronic device 1300.

An electronic device (e.g., the electronic device 600 of FIG. 6) according to various example embodiments of the disclosure may include a communication circuit 610, and a processor 620 operatively connected to the communication circuit 610, wherein the processor 620 is configured to generate first configuration information related to scanning to search for another cluster for cluster merging by the electronic device 600 and a first external electronic device 803 included in a neighbor awareness networking (NAN) cluster, control the communication circuit 610 to transmit the first configuration information to the first external electronic device 803, control the communication circuit 610 to perform scanning, based on the first configuration information, to search for a signal broadcast by an external electronic device belonging to another cluster, transmit, based on discovery of the another cluster, information on the another cluster to the first external electronic device 803, and perform a series of operations for merging into the another cluster, wherein the first configuration information is configured so that a time point at which the electronic device 600 performs scanning and a time point at which the first external electronic device 803 performs scanning are different.

In the electronic device 600 according to the various example embodiments of the disclosure, the processor 620 may be configured to receive, from the first external electronic device 803, a signal indicating that the first external electronic device 803 has discovered the another cluster, and perform a series of operations for merging into the another cluster, based on information on the another cluster, which is included in the signal indicating discovery of the another cluster.

In the electronic device 600 according to the various example embodiments of the disclosure, the first configuration information may include a start time for scanning of the electronic device 600, a duration of a scanning interval of the electronic device 600, and/or a scanning cycle of the electronic device 600.

In the electronic device 600 according to various example embodiments of the disclosure, the processor 620 may be configured to generate the first configuration information so that scanning of the first external electronic device 803 is performed at a time point that is substantially the same as a time point corresponding to a half of the scanning cycle of the electronic device 600.

In the electronic device 600 according to various example embodiments of the disclosure, the processor 620 may be configured to receive a signal for requesting transmission of the first configuration information, the signal being transmitted by the first external electronic device 803, transmit the first configuration information including the start time for scanning of the electronic device 600 to the first external electronic device 803 in response to reception of the signal for requesting transmission of the first configuration information, and transmit the first configuration information, which includes a start time for scanning of the first external electronic device 803, a duration of a scanning interval of the first external electronic device 803, and/or a scanning cycle of the first external electronic device 803, to the first external electronic device 803, based on the first external electronic device 803 having requested to assign scanning of the first external electronic device 803.

In the electronic device 600 according to various example embodiments of the disclosure, the processor 620 may be configured to receive a signal for requesting transmission of the first configuration information, the signal being transmitted by the first external electronic device 803, transmit the first configuration information including the start time for scanning of the electronic device 600 to the first external electronic device 803 in response to reception of the signal for requesting transmission of the first configuration information, receive second configuration information including a start time for scanning of the first external electronic device 803, a duration of a scanning interval of the first external electronic device 803, and/or a scanning cycle of the first external electronic device 803, which are configured by the first external electronic device 803, and update the first configuration information, based on the received second configuration information.

In the electronic device 600 according to various example embodiments of the disclosure, the processor 620 may be configured to, based on identification that a second external electronic device 805 included in the cluster participates in scanning to search for a signal broadcast by an external electronic device belonging to the another cluster, update the first configuration information related to the cluster merging that is to be performed by the first external electronic device 803, the second external electronic device 805, and the electronic device 600, and control the communication circuit 610 to transmit the first configuration information to the second external electronic device 805, wherein the first configuration information is configured so that a time point at which the electronic device 600 performs scanning, a time point at which the first external electronic device 803 performs scanning, and a time point at which the second external electronic device 805 performs scanning are different.

In the electronic device 600 according to various example embodiments of the disclosure, the processor 620 may be configured to receive a signal for requesting transmission of the first configuration information, the signal being transmitted by the second external electronic device 805, transmit the first configuration information including the start time for scanning of the electronic device 600 and the start time for scanning of the first external electronic device 803 to the second external electronic device 805 in response to reception of the signal for requesting transmission of the first configuration information, and in response to the second external electronic device 805 having requested to assign scanning of the second external electronic device 805, transmit the first configuration information, which includes a start time for scanning of the second external electronic device 805, a duration of a scanning interval of the second external electronic device 805, and/or a scanning cycle of the second external electronic device 805, to the second external electronic device 805.

In the electronic device 600 according to various example embodiments of the disclosure, the processor 620 may be configured to generate the first configuration information so that the second external electronic device 805 performs scanning between the start time for scanning of the electronic device 600 and the start time for scanning of the first external electronic device 803.

In the electronic device 600 according to various example embodiments of the disclosure, the processor 620 may be configured to receive a signal for the second external electronic device 805 to request transmission of the first configuration information, transmit the first configuration information including the start time for scanning of the electronic device 600 to the second external electronic device 805 in response to reception of the signal for requesting transmission of the first configuration information, receive third configuration information including the start time for scanning of the second external electronic device 805, the duration of the scanning interval of the second external electronic device 805, and/or the scanning cycle of the second external electronic device 805, which are configured by the second external electronic device 805, and based on identification that the start time for scanning of the first external electronic device 803 and the start time for scanning of the second external electronic device 805 are identical, transmit, to the second external electronic device 805, a message for requesting to change the start time for scanning of the second external electronic device 805.

An operation method of the electronic device 600 according to various example embodiments of the disclosure may include generating first configuration information related to scanning to search for another cluster by the electronic device 600 and the first external electronic device 803 included in a neighbor awareness networking (NAN) cluster, transmitting the first configuration information to the first external electronic device 803, performing scanning, based on the first configuration information, to search for a signal broadcast by an external electronic device belonging to another cluster, transmitting, based on discovery of the another cluster, information on the another cluster to the first external electronic device 803, and performing a series of operations for merging into the another cluster, wherein the configuration is configured so that a time point at which the electronic device 600 performs scanning and a time point at which the first external electronic device 803 performs scanning are different.

The operation method of the electronic device 600 according to the various example embodiments of the disclosure may further include receiving, from the first external electronic device 803, a signal indicating that the first external electronic device 803 has discovered the another cluster, and performing a series of operations for merging into the another cluster, based on information on the another cluster, which is included in the signal indicating discovery of the another cluster.

In the operation method of the electronic device 600 according to the various example embodiments of the disclosure, the first configuration information may include a start time for scanning of the electronic device 600, a duration of a scanning interval of the electronic device 600, and/or a scanning cycle of the electronic device 600.

In the operation method of the electronic device 600 according to the various example embodiments of the disclosure, the generating of the first configuration information may include generating the configuration information so that scanning of the first external electronic device 803 is performed at a time point that is substantially the same as a time point corresponding to a half of the scanning cycle of the electronic device 600.

The operation method of the electronic device 600 according to the various example embodiments of the disclosure may further include receiving a signal for requesting transmission of the first configuration information, the signal being transmitted by the first external electronic device 803, transmitting the first configuration information including the start time for scanning of the electronic device 600 to the first external electronic device 803 in response to reception of the signal for requesting transmission of the first configuration information, and transmitting the first configuration information, which includes a start time for scanning of the first external electronic device 803, a duration of a scanning interval of the first external electronic device 803, and/or a scanning cycle of the first external electronic device 803, to the first external electronic device 803, based on the first external electronic device 803 having requested to assign scanning of the first external electronic device 803.

The operation method of the electronic device 600 according to the various example embodiments of the disclosure may further include receiving a signal for requesting transmission of the first configuration information, the signal being transmitted by the first external electronic device 803, transmitting the first configuration information including the start time for scanning of the electronic device 600 to the first external electronic device 803 in response to reception of the signal for requesting transmission of the first configuration information, receiving second configuration information including a start time for scanning of the first external electronic device 803, a duration of a scanning interval of the first external electronic device 803, and/or a scanning cycle of the first external electronic device 803, which are configured by the first external electronic device 803, and updating the first configuration information, based on the received second configuration information.

The operation method of the electronic device 600 according to the various example embodiments of the disclosure may further include, based on identification that a second external electronic device 805 included in the cluster participates in scanning to search for a signal broadcast by an external electronic device belonging to the another cluster, updating the first configuration information related to the cluster merging that is to be performed by the first external electronic device 803, the second external electronic device 805, and the electronic device 600, and transmitting the first configuration information to the second external electronic device 805, wherein the first configuration information is configured so that a time point at which the electronic device 600 performs scanning, a time point at which the first external electronic device 803 performs scanning, and a time point at which the second external electronic device 805 performs scanning are different.

The operation method of the electronic device 600 according to the various example embodiments of the disclosure may further include receiving a signal for requesting transmission of the first configuration information, the signal being transmitted by the second external electronic device 805, transmitting the first configuration information including the start time for scanning of the electronic device 600 and the start time for scanning of the first external electronic device 803 to the second external electronic device 805 in response to reception of the signal for requesting transmission of the first configuration information, and in response to the second external electronic device 805 having requested to assign scanning of the second external electronic device 805, transmitting the first configuration information, which includes a start time for scanning of the second external electronic device 805, a duration of a scanning interval of the second external electronic device 805, and/or a scanning cycle of the second external electronic device 805, to the second external electronic device 805.

In the operation method of the electronic device 600 according to various example embodiments of the disclosure, the generating of the first configuration information may include generating the first configuration information so that the second external electronic device 805 performs scanning between the start time for scanning of the electronic device 600 and the start time for scanning of the first external electronic device 803.

The operation method of the electronic device 600 according to the various example embodiments of the disclosure may further include receiving a signal from the second external electronic device 805 to request transmission of the first configuration information, transmitting the first configuration information including the start time for scanning of the electronic device 600 to the second external electronic device 805 in response to reception of the signal for requesting transmission of the first configuration information, receiving third configuration information including the start time for scanning of the second external electronic device 805, the duration of the scanning interval of the second external electronic device 805, and/or the scanning cycle of the second external electronic device 805, which are configured by the second external electronic device 805, and based on identification that the start time for scanning of the first external electronic device 803 and the start time for scanning of the second external electronic device 805 are identical, transmitting, to the second external electronic device 805, a message for requesting to change the start time for scanning of the second external electronic device 805.

The electronic device according to various example embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium, where the term "non-transitory" refers to the storage medium being a tangible device, and does not include a signal (e.g., an electromagnetic wave), but this term does not differentiate between data being semi-permanently stored in the storage medium and data being temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a communication circuit; and
a processor comprising processing circuitry operatively connected to the communication circuit, and
memory storing instructions, which when executed by the processor, cause the electronic device to:
generate first configuration information related to scanning to search for a neighbor awareness networking (NAN) cluster to which the electronic device does not belong;
control the communication circuit to transmit the first configuration information to a first external electronic device which belongs to a NAN cluster to which the electronic device belongs;
control the communication circuit to perform scanning, based on the first configuration information, to search for NAN cluster to which the electronic device does not belong; and
based on discovering a NAN cluster to which the electronic device does not belong, control the communication circuit to transmit first information on the discovered NAN cluster to the first external electronic device, and control the communication circuit to perform operations for merging the discovered NAN cluster and the NAN cluster to which the electronic device belongs,
wherein the first configuration information includes second information to enable the first external electronic device to perform scanning to search for a NAN cluster at a first time point which is different from a second time point at which the electronic device performs scanning to search for a NAN cluster, and
wherein the first information enables the first external electronic device to perform operations for merging the discovered NAN cluster and the NAN cluster to which the electronic device belongs.

2. The electronic device of claim 1, wherein the memory further stores instructions which when executed by the processor, cause the electronic device to:
in case that the first external electronic device discovers the NAN cluster to which the electronic device does not belong before the electronic device discovers the NAN cluster to which the electronic device does not belong by searching at the first time point as indicated by the first configuration information, receive, from the first external electronic device, a signal indicating that the first external electronic device has discovered the NAN cluster to which the electronic device does not belong; and
perform the operations for merging the discovered NAN cluster and the NAN cluster to which the electronic device belongs, based on third information on the discovered NAN cluster, which is included in the signal indicating that the first external electronic device has discovered the NAN cluster to which the electronic device does not belong.

3. The electronic device of claim 1, wherein the first configuration information comprises a start time for scanning of the electronic device, a duration of a scanning interval of the electronic device, and/or a scanning cycle of the electronic device.

4. The electronic device of claim 1, wherein the electronic device performs scanning at the second time point that is substantially the same as a time point corresponding to a half of a scanning cycle of the first external electronic device.

5. The electronic device of claim 1, wherein memory further stores instructions which when executed by the processor, cause the electronic device to:
receive, from the first external electronic device, a signal for requesting transmission of the first configuration information;
in response to reception of the signal for requesting transmission of the first configuration information, transmit the first configuration information comprising a start time for scanning of the electronic device, to the first external electronic device; and
in response to request, by the first external electronic device, to assign scanning of the first external electronic device, transmit the first configuration information, which comprises a start time for scanning of the first external electronic device, a duration of a scanning interval of the first external electronic device, and/or a scanning cycle of the first external electronic device, to the first external electronic device.

6. The electronic device of claim 1, wherein the memory further stores instructions which when executed by the processor, cause the electronic device to:
receive, from the first external electronic device, a signal for requesting transmission of the first configuration information;
in response to reception of the signal for requesting transmission of the first configuration information, transmit the first configuration information comprising a start time for scanning of the electronic device, to the first external electronic device;
receive second configuration information comprising a start time for scanning of the first external electronic device, a duration of a scanning interval of the first external electronic device, and/or a scanning cycle of the first external electronic device, which are configured by the first external electronic device; and
update the first configuration information, based on the received second configuration information.

7. The electronic device of claim 1, wherein the memory further stores instructions which when executed by the processor, cause the electronic device to:
based on identification that a second external electronic device included in the cluster participates in scanning to search for the NAN cluster to which the electronic device does not belong, update the first configuration information related to the cluster merging that is to be performed by the first external electronic device, the second external electronic device, and the electronic device; and
control the communication circuit to transmit the first configuration information to the second external electronic device,
wherein the second time point at which the electronic device performs scanning, the first time point at which the first external electronic device performs scanning, and a third time point at which the second external electronic device performs scanning are different.

8. The electronic device of claim 7, wherein the memory further stores instructions which when executed by the processor, cause the electronic device to:
receive, from the second external electronic device, a signal for requesting transmission of the first configuration information;
in response to reception of the signal for requesting transmission of the first configuration information, transmit the first configuration information comprising a start time for scanning of the electronic device and a start time for scanning of the first external electronic device to the second external electronic device; and
in response to the second external electronic device having requested to assign scanning of the second external electronic device, transmit the first configuration information, which comprises a start time for scanning of the second external electronic device, a duration of a scanning interval of the second external electronic device, and/or a scanning cycle of the second external electronic device, to the second external electronic device.

9. The electronic device of claim 8, wherein memory further stores instructions which when executed by the processor, cause the electronic device to generate the first configuration information so that the second external electronic device performs scanning between the start time for scanning of the electronic device and the start time for scanning of the first external electronic device.

10. The electronic device of claim 7, wherein the memory further stores instructions which when executed by the processor, cause the electronic device to:
receive a signal from the second external electronic device to request transmission of the first configuration information;
in response to reception of the signal for requesting transmission of the first configuration information, transmit the first configuration information comprising a start time for scanning of the electronic device to the second external electronic device;
receive third configuration information comprising a start time for scanning of the second external electronic device, a duration of a scanning interval of the second external electronic device, and/or a scanning cycle of the second external electronic device, which are configured by the second external electronic device; and
based on identification that the start time for scanning of the first external electronic device and the start time for scanning of the second external electronic device are identical, transmit, to the second external electronic device, a message for requesting to change the start time for scanning of the second external electronic device.

11. An operation method of an electronic device, the operation method comprising:
generating first configuration information related to scanning to search for a neighbor awareness networking (NAN) cluster to which the electronic device does not belong;
transmitting the first configuration information to a first external electronic device which belongs to a NAN cluster to which the electronic device belongs;
based on the first configuration information, performing scanning to search for NAN cluster to which the electronic device does not belong; and
based on discovering a NAN cluster to which the electronic device does not belong, transmitting first information on the discovered NAN cluster to the first external electronic device, and performing operations for merging the discovered NAN cluster and the NAN cluster to which the electronic device belongs,
wherein the first configuration information includes second information to enable the first external electronic device to perform scanning to search for a NAN cluster at a first time point which is different from a second time point at which the electronic device performs scanning to search for another cluster, and wherein the first information enables the first external electronic device to perform operations for merging the discovered NAN cluster and the NAN cluster to which the electronic device belongs.

12. The operation method of claim 11, further comprising:
in case that the first external electronic device discovers the NAN cluster to which the electronic device does not belong before the electronic device discovers the NAN cluster to which the electronic device does not belong by searching at the first time point as indicated by the first configuration information, receiving, from the first external electronic device, a signal indicating that the first external electronic device has discovered the NAN cluster to which the electronic device does not belong; and performing the operations for merging the NAN cluster to which the electronic device does not belong and the NAN cluster to which the electronic device belongs, based on information on the NAN cluster to which the electronic device does not belong, which is included in the signal indicating that the first external electronic device has discovered the NAN cluster to which the electronic device does not belong.

13. The operation method of claim 11, wherein the first configuration information comprises a start time for scanning of the electronic device, a duration of a scanning interval of the electronic device, and/or a scanning cycle of the electronic device.

14. The operation method of claim 11, wherein the first configuration information comprises the second information to enable the first external electronic device to performs scanning at the second time point that is substantially the same as a time point corresponding to a half of a scanning cycle of the first external electronic device.

15. The operation method of claim 11, further comprising:
receiving, from the first external electronic device, a signal for requesting transmission of the first configuration information;
in response to reception of the signal for requesting transmission of the first configuration information, transmitting the first configuration information comprising a start time for scanning of the electronic device to the first external electronic device; and
in response to the first external electronic device having requested to assign scanning of the first external electronic device, transmitting the first configuration information, which comprises a start time for scanning of the first external electronic device, a duration of a scanning interval of the first external electronic device, and/or a scanning cycle of the first external electronic device, to the first external electronic device.

16. The operation method of claim 11, further comprising:
receiving, from the first external electronic device, a signal for requesting transmission of the first configuration information;
in response to reception of the signal for requesting transmission of the first configuration information, transmitting the first configuration information comprising a start time for scanning of the electronic device to the first external electronic device;
receiving second configuration information comprising a start time for scanning of the first external electronic device, a duration of a scanning interval of the first external electronic device, and/or a scanning cycle of the first external electronic device, which are configured by the first external electronic device; and
updating the first configuration information, based on the received second configuration information.

17. The operation method of claim 11, further comprising:
based on identification that a second external electronic device included in the cluster participates in scanning to search for a signal broadcast by an external electronic device belonging to the NAN cluster to which the electronic device does not belong, updating the first configuration information related to the cluster merging that is to be performed by the first external electronic device, the second external electronic device, and the electronic device; and
transmitting the first configuration information to the second external electronic device,
wherein the first configuration information is configured so that the second time point at which the electronic device performs scanning, the first time point at which the first external electronic device performs scanning, and a third time point at which the second external electronic device performs scanning are different.

18. The operation method of claim 17, further comprising:
receiving, from the second external electronic device, a signal for requesting transmission of the first configuration information;
in response to reception of the signal for requesting transmission of the first configuration information, transmitting the first configuration information comprising a start time for scanning of the electronic device and a start time for scanning of the first external electronic device to the second external electronic device; and
in response to the second external electronic device having requested to assign scanning of the second external electronic device, transmitting the first configuration information, which comprises a start time for scanning of the second external electronic device, a duration of a scanning interval of the second external electronic device, and/or a scanning cycle of the second external electronic device, to the second external electronic device.

19. The operation method of claim 18, wherein the generating of the first configuration information comprises generating the first configuration information so that the second external electronic device performs scanning between the start time for scanning of the electronic device and the start time for scanning of the first external electronic device.

20. The operation method of claim 17, further comprising:
receiving a signal from the second external electronic device to request transmission of the first configuration information;
in response to reception of the signal for requesting transmission of the first configuration information, transmitting the first configuration information comprising a start time for scanning of the electronic device to the second external electronic device;
receiving third configuration information comprising a start time for scanning of the second external electronic device, a duration of a scanning interval of the second external electronic device, and/or a scanning cycle of the second external electronic device, which are configured by the second external electronic device; and
based on identification that a start time for scanning of the first external electronic device and the start time for scanning of the second external electronic device are identical, transmitting, to the second external electronic device, a message for requesting to change the start time for scanning of the second external electronic device.

* * * * *